(12) United States Patent
Mladin et al.

(10) Patent No.: US 12,556,964 B2
(45) Date of Patent: Feb. 17, 2026

(54) FAST QoS RULE CHANGES FOR HIGH PRIORITY MO DATA

(71) Applicant: INTERDIGITAL PATENT HOLDINGS, INC., Wilmington, DE (US)

(72) Inventors: Catalina Mladin, Hatboro, PA (US); Michael Starsinic, Newtown, PA (US); Quang Ly, North Wales, PA (US); Hongkun Li, Malvern, PA (US); Jiwan Ninglekhu, Royersford, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 294 days.

(21) Appl. No.: 18/253,675

(22) PCT Filed: Nov. 24, 2021

(86) PCT No.: PCT/US2021/060767
§ 371 (c)(1),
(2) Date: May 19, 2023

(87) PCT Pub. No.: WO2022/115567
PCT Pub. Date: Jun. 2, 2022

(65) Prior Publication Data
US 2024/0015567 A1 Jan. 11, 2024

Related U.S. Application Data

(60) Provisional application No. 63/118,250, filed on Nov. 25, 2020.

(51) Int. Cl.
*H04W 28/02* (2009.01)
(52) U.S. Cl.
CPC ................. *H04W 28/0268* (2013.01)

(58) Field of Classification Search
None
See application file for complete search history.

(56) References Cited

U.S. PATENT DOCUMENTS

| | | | |
|---|---|---|---|
| 2011/0310737 A1* | 12/2011 | Klingenbrunn | ... H04W 36/0044 370/235 |
| 2016/0217184 A1* | 7/2016 | Branson | ............. G06F 16/2379 |

(Continued)

FOREIGN PATENT DOCUMENTS

| | | | |
|---|---|---|---|
| WO | WO2017173897 | * | 10/2017 |
| WO | WO2018126692 | * | 7/2018 |
| WO | WO2020252711 | * | 12/2020 |

OTHER PUBLICATIONS

3GPP TS 23.501, System Architecture for the 5G System; Stage 2, V16.6.0, Sep. 2020, pp. 1-450.

(Continued)

*Primary Examiner* — Andre Tacdiran
(74) *Attorney, Agent, or Firm* — Flaster Greenberg P.C.

(57) ABSTRACT

Methods and apparatuses are described herein for providing fine-grained QoS rules within UE Policies. A network entity may receive triggers to update the policies of a user equipment (UE) with parameters based on input such as input from a third party. The network entity may derive fine-grained quality of service (QoS) rules and corresponding QoS Profiles and delivers them to the UE using a UE Policy container via the Non-Access Stratum (NAS). The fine-grained rules may comprise: a destination fully qualified domain name (FQDN) or uniform resource locator (URL), an Application ID, a User Route Selection Policy precedence value, etc. The fine-grained rules also provide mechanisms for time gating or volume gating. The UE may request new QoS treatment resulting in UE Policy update and may (Continued)

use the information in the fine-grained QoS rules when establishing or modifying PDU Session to apply QoS Flow Identifier (QFI) marking.

20 Claims, 12 Drawing Sheets

(56) References Cited

U.S. PATENT DOCUMENTS

| | | | | |
|---|---|---|---|---|
| 2018/0324631 | A1* | 11/2018 | Jheng | H04W 28/0263 |
| 2019/0159059 | A1* | 5/2019 | Jheng | H04W 28/0268 |
| 2019/0254118 | A1* | 8/2019 | Dao | H04L 67/141 |
| 2019/0394833 | A1 | 12/2019 | Talebi Fard et al. | |
| 2020/0053622 | A1 | 2/2020 | Huang-Fu et al. | |
| 2020/0359264 | A1* | 11/2020 | Rácz | H04W 76/16 |
| 2022/0210849 | A1* | 6/2022 | Xu | H04W 74/08 |
| 2022/0264370 | A1* | 8/2022 | Qiao | H04W 60/00 |
| 2022/0377545 | A1* | 11/2022 | Wang | H04L 65/1069 |

OTHER PUBLICATIONS

3GPP TS 23.502, Procedures for the 5G System; Stage 2, V16.6.0, Sep. 2020, pp. 1-600.
3GPP TS 23.503, Policy and Charging Control Framework for the 5G System; Stage 2, V16.6.0, Sep. 2020, pp. 1-118.
3GPP TS 24.501, Non-Access-Stratum (NAS) protocol for Evolved Packet System (EPS); Stage 3, V16.6.0, 2020-09, pp. 1-723.
3GPP TS 29.244, Interface between the Control Plane and the User Plane Nodes; Stage 3, V15.8.0, Dec. 2019, pp. 1-200.
3GPP TS 29.512 5G System; Session Management Policy Control Service; Stage 3, V16.6.0, Sep. 2020, pp. 1-199.
3GPP TS 29.513 5G System; Policy and Charging Control signalling flows and QoS parameter mapping; Stage 3, V17.0.0, Sep. 2020, pp. 1-145.
3GPP TS 29.514 5G System; Policy Authorization Service; Stage 3, V16.6.0, Sep. 2020, pp. 1-179.
3GPP TS 29.551 5G System; Packet Flow Description Management Service; Stage 3, V16.4.0, Jun. 2020, pp. 1-33.
3GPP TS 38.413, NG Application Protocol (NGAP) V16.3.0, Sep. 2020, pp. 1-461.
Huawei et al., "Domain descriptors in URSP", 3GPP TSG-CT WG1 Meeting #124-e, C1-204052, Jun. 2020, pp. 15.
Nokia et al., "TS 23.501: QoS Overview corrections and support for Ethernet PDU session", SA WG2 Meeting #122, S2-174720, Jun. 2017, pp. 6.

* cited by examiner

FAST QoS RULE CHANGES FOR HIGH PRIORITY MO DATA

CROSS-REFERENCE TO RELATED APPLICATIONS

This application is the National Stage Application of International Patent Application No. PCT/US2021/060767, filed Nov. 24, 2021, which claims the benefit of U.S. Provisional Patent Application No. 63/118,250, filed Nov. 25, 2020, which is hereby incorporated by reference in its entirety.

BACKGROUND

A user equipment (UE) may be used for a variety of functionalities. For example, UEs in an Internet of Things (IoT) system may be used for home automation functionalities including alarms (e.g., flood, fire, or burglar alarms). An IoT UE in such a scenario is likely to have long periods of inactivity, for example, between home automation control activities. Moreover, the overwhelming majority of communications supported are not critical, and therefore have low QoS requirements. However, for major events such as flood or fire alarms, the communications require a high level of QoS. Accordingly, there is a need for improved QoS procedures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for providing fine-grained quality of service (QoS) rules within UE Policies. In accordance with one embodiment, a network entity may receive triggers from other network functions (NFs) or application functions (AFs) to update the policies of a user equipment (UE) with parameters based on input such as input from a third party. The network entity may derive fine-grained QoS rules and corresponding QoS Profiles and may deliver them to the UE using a UE Policy container via the Non-Access Stratum (NAS). The fine-grained rules may comprise for example: a destination fully qualified domain name (FQDN) or uniform resource locator (URL), an Application ID, a User Route Selection Policy precedence value, etc. The fine-grained rules also may provide mechanisms for time gating or volume gating. The UE may request new QoS treatment resulting in a UE Policy update and may use the information in the fine-grained QoS rules when establishing or modifying a protocol data unit (PDU) Session to apply a QoS Flow Identifier (QFI) marking.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Methods and apparatuses are described herein for providing fine-grained quality of service (QoS) rules within UE Policies.

The following abbreviations may be used herein:
3GPP Third Generation Partnership Project
5GS 5G System
5QI 5G QoS Identifier
AF Application Function
AMBR Aggregate Maximum Bit Rate
AMF Access and Mobility Management Function
ARP Allocation and Retention Priority
CN Core Network
DL Downlink
DPI Deep Packet Inspection
GBR Guarantee Bit Rate
GFBR Guaranteed Flow Bit Rate
IP Internet Protocol
MFBR Maximum Flow Bit Rate
MNO Mobile Network Operator
MO Mobile Originated
NAS Non-Access Stratum
NF Network Function
PCC Policy and Charging Control
PCF Policy Control Function
PDU Protocol Data Unit
PFD Packet Flow Description
QFI QoS Flow Identifier
QoS Quality of Service
QRI QoS Rule Identifier
RAN Radio Access Network
RQA Reflective QoS Attribute
RQI Reflective QoS Indication
SDF Service Data Flow
SMF Session Management Function UE User Equipment
UL Uplink
UP User Plane
UPF User Plane Function
URSP User Route Selection Policy The following definitions may be used herein:

Application identifier: An identifier that can be mapped to a specific application traffic detection rule.

Service Data Flow Filter: A set of packet flow header parameter values/ranges used to identify one or more of the packets (IP or Ethernet) flows constituting a Service Data Flow.

Service Data Flow Template: The set of Service Data Flow filters in a policy rule or an application identifier in a policy rule referring to an application detection filter, required for defining a Service Data Flow.

As used herein, "Applying the QoS Rule" means that that the UE may apply the associated QFI value to the uplink traffic that is detected.

Figure 1:
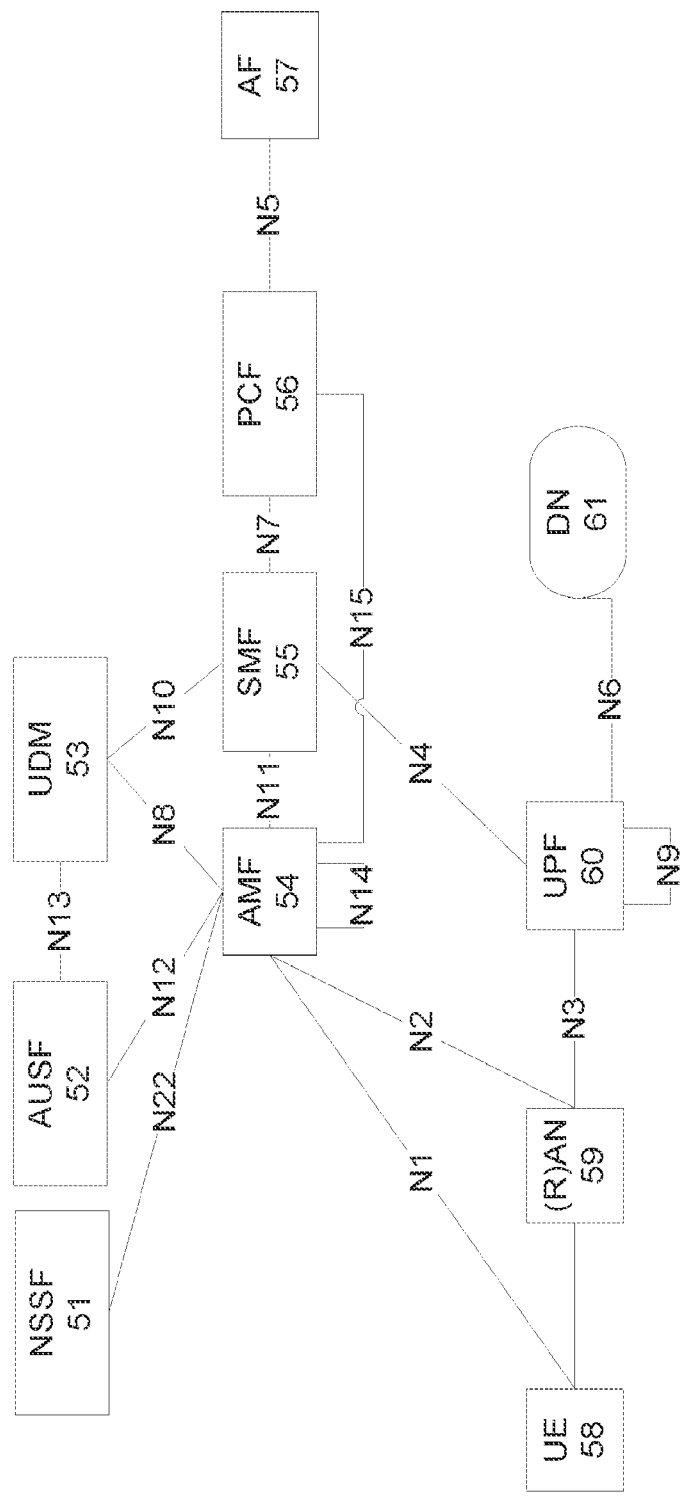
FIG. 1 shows a Non-Roaming 5G System Architecture in reference point representation.

FIG. 1 shows the 3GPP 5G non-roaming system architecture where various entities interact with each other over the indicated reference points 50. A User Equipment (UE) 58 may communicate with a Core Network (CN) to establish control signaling and enable the UE to use services from the CN. As shown in the example of FIG. 1, UE 58 has access, via Radio Access Network (RAN) 59, to Access and Mobility Management Function (AMF) 54 over the N1 interface. The RAN 59 has access to User Plane Function (UPF) 60 via the N3 interface.

The following descriptions highlight some of the Network Functions (NFs) from FIG. 1 relevant to the following descriptions:

RAN 59: The RAN node offers communication access from the UE to the core network for both control plane and user plane communications.

AMF 54: The UE may send an N1 message through the RAN node 59 to the AMF 54 to perform many control plane signaling functions such as registration, connection management, mobility management, access authentication and authorization, etc.

Session Management Function (SMF) 55: The SMF 55 is responsible for session management involved with establishing PDU sessions to allow UEs to send data to Data Networks (DNs) 61 such as the internet or to an application server and other session management related functions.

Policy and Control Function (PCF) 56: The PCF 56 provides the policy framework that governs network behavior, accesses subscription information to make policy decisions, etc.

The example of FIG. 1 also shows other NFs within the control plane such as Unified Data Management (UDM) 53, Application Function (AF) 57, and Authentication Server Function (AUSF) 52, and Network Slice Selection Function (NSSF) 51.

Service Data Flow detection is essential for determining the traffic that belongs to individual flows, which in turn are handled based on various QoS levels and use the service data flow template included in a PCC Rule provide by the PCF 56. Templates may define the traffic for the service data flow detection as a set of service data flow filters or an application identifier referring to an application detection filter. The SMF 55 may map the template in the PCC Rule into the detection information in a Packet Detection Rule to the UPF 60. The SMF 55 may also map the template into the detection information in Packet Filter information for the UE 58. The SMF 55 may also derive the QoS Profiles for the RAN 59.

Each service data flow template may contain any number of service data flow filters and is applicable to the uplink, the downlink or both the uplink and the downlink. The application detection filters provided to the SMF 55 may be extended with the PFDs provided by a third-party AF 57.

Each service data flow filter may contain information about whether explicit signaling of the corresponding traffic mapping information to the UE 58 is required.

The network may ensure that the traffic mapping information signaled to the UE 58 reflects the PCC rules, except for those extending the inspection beyond what can be signaled to the UE 58. The PCC rules may restrict what traffic is allowed compared to what is explicitly signaled to the UE 58. The PCF 56 may, per service data flow filter, indicate that the SMF 55 is required to explicitly signal the corresponding traffic mapping information to the UE 58.

The SMF 55 may be responsible for instructing the UP function about how to detect user data traffic. For IPv4 or IPv6 or IPv4v6 PDU Session type, detection information provided to UPF 60 may comprise a combination of: CN tunnel info, Network instance, QFI, or IP Packet Filter Set.

Application Identifier: The Application ID comprises an index to a set of application detection rules configured in UPF.

The Rel-16 5G System provides APIs that allow 3rd party service providers to deliver an extended configuration for service data flow detection. This information is provided as application detection rules in Packet Flow Descriptions (PFDs) via the NEF. These rules enable the detection of application traffic via IP filters or with other granularities, e.g. via URLs that need to be matched (or domain names or protocol).

5G NR QoS Parameters are described herein. 3GPP specification 23.501 defines the following 5G QoS Parameters as part of QoS Implementation.

(1) 5G QoS Identifier (5QI): a scalar that is used as a reference to 5G QoS characteristics, i.e. access node-specific parameters that control QoS forwarding treatment for the QoS Flow (e.g. scheduling weights, admission thresholds, queue management thresholds, link layer protocol configuration, etc.). Standardized 5QI values have a one-to-one mapping to a standardized combination of 5G QoS characteristics. The 5G QoS characteristics for pre-configured 5QI values are pre-configured in the Access Node (gNB). Standardized or pre-configured 5G QoS characteristics, are indicated through the 5QI value, and are not signaled on any interface, unless certain 5G QoS characteristics are modified. The 5G QoS characteristics for QoS Flows with dynamically assigned 5QI are signaled as part of the QoS profile.

(2) Allocation and Retention Priority (ARP): contains information about the priority level, the pre-emption capability and the pre-emption vulnerability. The ARP priority level defines the relative importance of a resource request to allow in deciding whether a new QoS Flow may be accepted or needs to be rejected in the case of resource limitations (typically used for admission control of GBR traffic). It may also be used to decide which existing QoS Flow to pre-empt during resource limitations. ARP has following characteristics:

The range of the ARP priority level is 1 to 15 with 1 as the highest level of priority.

The ARP priority levels 1-8 may be assigned to resources for services that are authorized to receive prioritized treatment within an operator domain (i.e. that are authorized by the serving network). The ARP priority levels 9-15 may be assigned to resources that are authorized by the home network and thus applicable when a UE is roaming.

The ARP pre-emption capability may define whether a service data flow may get resources that were already assigned to another service data flow with a lower ARP priority level.

The ARP pre-emption vulnerability may define whether a service data flow may lose the resources assigned to it in order to admit a service data flow with a higher ARP priority level. The ARP pre-emption vulnerability of the QoS Flow, which the default QoS rule is associated with should be set appropriately to minimize the risk of unnecessary release of this QoS Flow.

(3) Reflective QoS Attribute (RQA): a parameter which indicates that certain traffic (not necessarily all) carried on this QoS Flow is subject to Reflective QoS. When the RQA is signaled for a QoS Flow, the RAN/AN enables the transfer of the RQI for AN resource corresponding to this QoS Flow. The RQA may be signaled to NG-RAN via the N2 reference point at UE context establishment in NG-RAN and at QoS Flow establishment or modification.

(4) Notification Control: The QoS Parameter Notification control indicates whether notifications are requested from the NG-RAN when the GFBR can no longer (or can again) be guaranteed for a QoS Flow during the lifetime of the QoS Flow. Notification control may be used for a GBR QoS Flow if the application traffic is able to adapt to the change in the QoS (e.g. if the AF is capable to trigger rate adaptation).

(5) Flow Bit Rates: (for GBR QoS Flows only, applicable for Uplink and Downlink). Guaranteed Flow Bit Rate (GFBR) denotes the bit rate that is guaranteed to be provided by the network to the QoS Flow over the Averaging Time Window. Maximum Flow Bit Rate (MFBR) limits the bit rate to the highest bit rate that is expected by the QoS Flow. Bit rates above the GFBR value and up to the MFBR value, may be provided with relative priority determined by the Priority Level of the QoS Flows. GFBR and MFBR are signaled to the (R)AN in the QoS Profile and signaled to the UE as QoS Flow level QoS parameter for each individual QoS Flow.

(6) Aggregate Bit Rates:

Per Session Aggregate Maximum Bit Rate (Session-AMBR, per PDU Session): The subscribed Session-AMBR is a subscription parameter that is retrieved by the SMF from UDM. The SMF may use the subscribed Session-AMBR or modify it based on local policy or use the authorized Session-AMBR received from PCF to get the Session-AMBR, which is signaled to the appropriate UPF entity(ies) to the UE and to the (R)AN (to enable the calculation of the UE-AMBR). The Session-AMBR limits the aggregate bit rate that can be expected to be provided across all Non-GBR QoS Flows for a specific PDU Session. The Session-AMBR is measured over an AMBR averaging window, which is a standardized value. The Session-AMBR is not applicable to GBR QoS Flows.

Per UE Aggregate Maximum Bit Rate (UE-AMBR, per UE): The UE-AMBR limits the aggregate bit rate that can be expected to be provided across all Non-GBR QoS Flows of a UE. Each (R)AN may set its UE-AMBR to the sum of the Session-AMBR of all PDU Sessions with active user plane to this (R)AN up to the value of the subscribed UE-AMBR. The subscribed UE-AMBR is a subscription parameter which is retrieved from UDM and provided to the (R)AN by the AMF. The UE-AMBR is measured over an AMBR averaging window which is a standardized value. The UE-AMBR is not applicable to GBR QoS Flows.

(7) Default QoS-related values: For each PDU Session Setup, the SMF retrieves from the UDM the subscribed default values for the 5QI and the ARP priority level and the 5QI Priority Level. The subscribed default 5QI value may be a Non-GBR 5QI from the standardized value range. The SMF may change the subscribed values for the default 5QI and the ARP priority level. If the 5QI Priority Level is received, the SMF may set QoS parameters for the QoS Flow which the default QoS rule is associated with based on a local configuration or interaction with the PCF. The SMF may set the ARP pre-emption capability and the ARP pre-emption vulnerability of the QoS Flow which the default QoS rule is associated with based on a local configuration or interaction with the PCF. The SMF may apply the same values for the ARP priority level, the ARP pre-emption capability and the ARP pre-emption vulnerability for all QoS Flows of the PDU Session unless a different ARP setting is required for a QoS Flow. If a dynamic PCC is not deployed, the SMF can have a DNN based configuration to enable the establishment of a GBR QoS Flow as the QoS Flow that is associated with the default QoS rule. This configuration contains a standardized GBR 5QI as well as GFBR and MFBR for UL and DL.

(8) Maximum Packet Loss Rate (UL, DL): indicates the maximum rate for lost packets of the QoS flow that can be tolerated in the uplink and downlink direction. This is provided to the QoS flow if it is compliant with the GFBR.

Session binding is described herein. Session binding is the association of the AF session information to one and only one PDU Session. The PCF performs the session binding taking the following PDU Session parameters into account:

a) For an IP type PDU Session, the UE IPv4 address and/or IPv6 network prefix; For an Ethernet type PDU Session, the UE MAC address(es);

b) The UE identity (e.g. SUPI), if present;

c) The information about the Data Network (DN) the user is accessing, i.e. DNN, if present.

Once it has determined the impacted PDU Session, the PCF may identify the PCC rules affected by the AF session information, including new PCC rules to be installed and existing PCC rules to be modified or removed.

UL Traffic treatment is described herein. The following may apply for processing of UL traffic:

(1) UE may use the stored QoS rules to determine a mapping between UL User Plane traffic and QoS Flows. The UE may mark the UL PDU with the QFI of the QoS rule containing the matching Packet Filter and may transmit the UL PDUs using the corresponding access specific resource for the QoS Flow based on the mapping provided by the (R)AN. For NG-RAN, the UL behavior is specified in TS 38.300 clause 10.5.2.

(2) (R)AN may transmit the PDUs over an N3 tunnel towards the UPF. When passing an UL packet from the (R)AN to the CN, the (R)AN includes the QFI value, in the encapsulation header of the UL PDU, and may select the N3 tunnel.

(3) The (R)AN may perform the transport level packet marking in the UL on a per QoS Flow basis with a transport level packet marking value that is determined based on the 5QI, the Priority Level (if explicitly signaled), and the ARP priority level of the associated QoS Flow.

(4) The UPF may verify whether the QFIs in the UL PDUs are aligned with the QoS Rules provided to the UE or implicitly derived by the UE in the case of Reflective QoS).

(5) The UPF and the UE may perform Session-AMBR enforcement as specified in clause 5.7.1.8 and the UPF performs counting of packets for charging.

QoS Rules treatment at the UE is described herein. The UE may perform the classification and marking of UL User plane traffic, i.e. the association of UL traffic to QoS Flows, based on QoS rules. These QoS rules may be explicitly provided to the UE (i.e. explicitly signaled QoS rules using the PDU Session Establishment/Modification procedure), pre-configured in the UE or implicitly derived by the UE by applying Reflective QoS. A QoS rule contains the QFI of the associated QoS Flow, a Packet Filter Set and a precedence value. An explicitly signaled QoS rule contains a QoS rule identifier which is unique within the PDU Session and is generated by SMF There can be more than one QoS rule associated with the same QoS Flow (i.e. with the same QFI).

When the UE informs the network about the number of supported Packet Filters for signaled QoS rules for the PDU Session the SMF ensures that the sum of the Packet Filters used by all signaled QoS rules for a PDU Session does not exceed the number indicated by the UE.

A default QoS rule may be required to be sent to the UE for every PDU Session establishment, and it is associated with a QoS Flow. For an IP type PDU Session or Ethernet type PDU Session, the default QoS rule is the only QoS rule of a PDU Session which may contain a Packet Filter Set that allows all UL packets, and in this case, the highest precedence value may be used for the QoS rule.

As long as the default QoS rule does not contain a Packet Filter Set or contains a Packet Filter Set that allows all UL packets, Reflective QoS should not be applied for the QoS Flow which the default QoS rule is associated with and the RQA should not be sent for this QoS Flow.

The purpose of the QoS rules information element is to indicate a set of QoS rules to be used by the UE, where each QoS rule is a set of parameters as described in 3GPP TS 24.501 subclause 6.2.5.1.1.2:
 a) for classification and marking of uplink user traffic; and
 b) for identification of a QoS flow which the network is to use for a particular downlink user traffic.

The QoS rules may contain a set of packet filters consisting of zero or more packet filters for UL direction, zero or more packet filters for DL direction, zero or more packet filters for both UL and DL directions or any combinations of these. The set of packet filters determine the traffic mapping to QoS flows.

The QoS rules information element may be coded as shown in the following tables from 3GPP TS 24.501.

TABLE 1

QoS rules information element

| 8 | 7 | 6 | 5 | 4 | 3 | 2 | 1 | |
|---|---|---|---|---|---|---|---|---|
| | | | QOS rules IEI | | | | | octet 1 |
| | | | Length of QoS rules IE | | | | | octet 2 |
| | | | | | | | | octet 3 |
| | | | QOS rule 1 | | | | | octet 4 |
| | | | | | | | | octet u |
| | | | QOS rule 2 | | | | | octet u + 1 |
| | | | | | | | | octet v |
| | | | . . . | | | | | octet v + 1 |
| | | | | | | | | octet w |
| | | | QOS rule n | | | | | octet w + 1 |
| | | | | | | | | octet x |

TABLE 2

Single QoS rule

| 8 | 7 | 6 | 5 | 4 | 3 | 2 | 1 | |
|---|---|---|---|---|---|---|---|---|
| | | | QOS rule identifier | | | | | octet 4 |
| | | | Length of QoS rule | | | | | octet 5 |
| | | | | | | | | octet 6 |
| | Rule operation code | | DQR bit | | Number of packet filters | | | octet 7 |
| | | | Packet filter list | | | | | octet 8* |
| | | | | | | | | octet m* |
| | | | QOS rule precedence | | | | | octet m + 1* |
| 0 Spare | | | Segregation | | QoS flow identifier (QFI) | | | octet m + 2* |

TABLE 3

Packet filter list example

| 8 | 7 | 6 | 5 | 4 | 3 | 2 | 1 | |
|---|---|---|---|---|---|---|---|---|
| 0 | 0 Spare | | Packet filter direction 1 | | Packet filter identifier 1 | | | octet 8 |
| | | | Length of packet filter contents 1 | | | | | octet 9 |
| | | | Packet filter contents 1 | | | | | octet 10 |
| | | | | | | | | octet m |
| 0 | 0 Spare | | Packet filter direction 2 | | Packet filter identifier 2 | | | octet m + 1 |
| | | | Length of packet filter contents 2 | | | | | octet m + 2 |
| | | | Packet filter contents 2 | | | | | octet m + 3 |
| | | | | | | | | octet n |
| | | | . . . | | | | | octet n + 1 |
| | | | | | | | | octet y |
| 0 | 0 Spare | | Packet filter direction N | | Packet filter identifier N | | | octet y + 1 |
| | | | Length of packet filter contents N | | | | | octet y + 2 |
| | | | Packet filter contents N | | | | | octet y + 3 |
| | | | | | | | | octet z |

In a scenario where traffic is initiated in the DL and application of the QoS rules is based on URL matching, the UPF can apply QoS marking to the DL traffic and the UE can be configured for Reflective QoS so that the same QoS treatment may be applied in the UL.

IP Packet Filter Set for a PDU Session of type IP supports any combination of:
 (1) Source/destination IP address or IPv6 prefix.
 (2) Source/destination port number.
 (3) Protocol ID of the protocol above IP/Next header type.
 (4) Type of Service (TOS) (IPv4)/Traffic class (IPv6) and Mask.
 (5) Flow Label (IPv6).
 (6) Security parameter index.
 (7) Packet Filter direction.

Another QoS treatment method at the UE may involve the use of reflective QoS. Reflective QoS is controlled on the network side on per-packet basis, by including a Reflective QoS Indication (RQI) together with a Reflective QoS Timer (RQ Timer) value that is either signaled to the UE upon PDU Session Establishment (or upon PDU Session Modification) or set to a default value. The RQ Timer value provided by the core network is at the granularity of PDU session.

Upon reception of a DL packet with RQI, if a UE derived QoS rule with a Packet Filter corresponding to the DL packet does not already exist, the UE creates a new UE derived QoS rule with a Packet Filter corresponding to the DL packet. The UE also starts a timer set to the RQ Timer value for the UE derived QoS rule and the updates the QFI of the UL packet with the QFI based on the derived rule.

QoS Profiles for the RAN are described herein. The concept of QoS Profile encompasses the QoS parameters sent to RAN for each QoS flow and is defined in 3GPP 23.501 clause 5.7.1.2 as follows:

For each QoS Flow, the mandatory QoS parameters in the QoS profile are
(1) 5G QoS Identifier (5QI); and
(2) Allocation and Retention Priority (ARP).

For each Non-GBR QoS Flow only, the QoS profile optionally may include Reflective QoS Attribute (RQA).

For each GBR QoS Flow only, the QoS profile also may include: Guaranteed Flow Bit Rate (GFBR)—UL and DL (mandatory); Maximum Flow Bit Rate (MFBR)—UL and DL (mandatory); Notification control (optional); Maximum Packet Loss Rate—UL and DL (optional).

The QoS Profile may be provided to the RAN via the N2 interface by AMF in the PDU Session Resource Setup Request Transfer and PDU Session Resource Modify Request Transfer, as well as handover requests. In this context, the QoS Profile is provided as a list of "QoS Flow Setup Request Item(s)". Each list item in turn includes mandatory QFI and QoS Flow Level QoS Parameters as described in TS 38.413 clause 9.3.1.12.

Based on the PDU Session Resource Setup Request, for each requested PDU session, if resources are available for the requested configuration, the NG-RAN node may establish at least one DRB and associate each accepted QoS flow of the PDU session to a DRB established.

Based on the PDU Session Resource Modify Request Transfer, for each PDU session requested (to be added or modified), the NG-RAN node modifies (if needed) the DRB configuration and associates the QoS flows indicated to be setup or modified with the DRB.

QoS Flow handling at the SMF per PDU Session is described herein. Based on 3GPP 29.512 clause 4.2.6.2.3 the PCF can provide the authorized QoS for a PCC rule to the SMF using the PCC rule provisioning procedure. If the authorized QoS is provided for a PCC rule, the SMF derives the QoS profile towards the access network, the QoS rule towards the UE and the QoS information with the PDR(s) towards the UPF.

Based on 23.501 clause 5.8.2.7, for every QoS Flow, the SMF determines the transport level packet marking value (e.g., the differentiated services code point (DSCP) in the outer IP header) based on the 5QI, the Priority Level (if explicitly signaled) and optionally, the ARP priority level and provide the transport level packet marking value to the UPF.

The SMF provides the Session-AMBR values of the PDU Session to the UPF so that the UPF can enforce the Session-AMBR of the PDU Session across all Non-GBR QoS Flows of the PDU Session. SMF provides the GFBR and MFBR value for each GBR QoS Flow of the PDU Session to the UPF. SMF may also provide the Averaging window to the UPF.

UE Route Selection Policy (URSP) Rules are described herein. The URSP includes a prioritized list of URSP rules. URSP rules are policies that are used by the UE to determine how to route outgoing traffic. Traffic can be routed to an established PDU Session, can be offloaded to non-3GPP access outside a PDU Session, or can trigger the establishment of a new PDU Session. The rules are provided by the PCF in the 5GC to the UE.

URSP Rules have two main parts. A Traffic Descriptor Part is used by the UE to determine what traffic the rule applies to. A Route Selection Descriptors (RSD) part that includes descriptions of route(s) (i.e. S-NSSAI, DNN, Access Type, etc.) that may be used to route the data that matches the traffic descriptor.

The UE may also have local preferences that can be used to determine how to treat traffic. Local preferences take precedence over URSPs.

The structure of the URSP rules is shown in Table 1 and it includes a Traffic Descriptor section, as well as a List of Route Selection Descriptors.

TABLE 4

UE Route Selection Policy Rule

| Information name | Description | Category | PCF permitted to modify in a UE context | Scope |
| --- | --- | --- | --- | --- |
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |

TABLE 4-continued

UE Route Selection Policy Rule

| Information name | Description | Category | PCF permitted to modify in a UE context | Scope |
| --- | --- | --- | --- | --- |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |
| Rule Precedence | Determines the order the URSP rule is enforced in the UE. | Mandatory (NOTE 1) | Yes | UE context |

(NOTE 1):
Rules in a URSP shall have different precedence values.
(NOTE 2):
The information is used to identify the Application(s) that is(are) running on the UE's OS. The OSId does not include an OS version number. The OSAppId does not include a version number for the application.
(NOTE 3):
At least one of the Traffic descriptor components shall be present.
(NOTE 4):
The format and some values of Connection Capabilities, e.g. "ims", "mms", "internet", etc., are defined in TS 24.526 [19]. More than one connection capabilities value can be provided.
(NOTE 5):
A URSP rule cannot contain the combination of the Traffic descriptor components IP descriptors and Non-IP descriptors.

Organization of UE Policy Information is described herein. The policy information part of the UE's subscription is organized in the UDR as a Policy Set Entry. A Policy Set Entry comprises one or more Policy Section Identifiers (PSIs). Each PSI consist of zero or more ANDSP and/or URSP policies.

Figure 2:
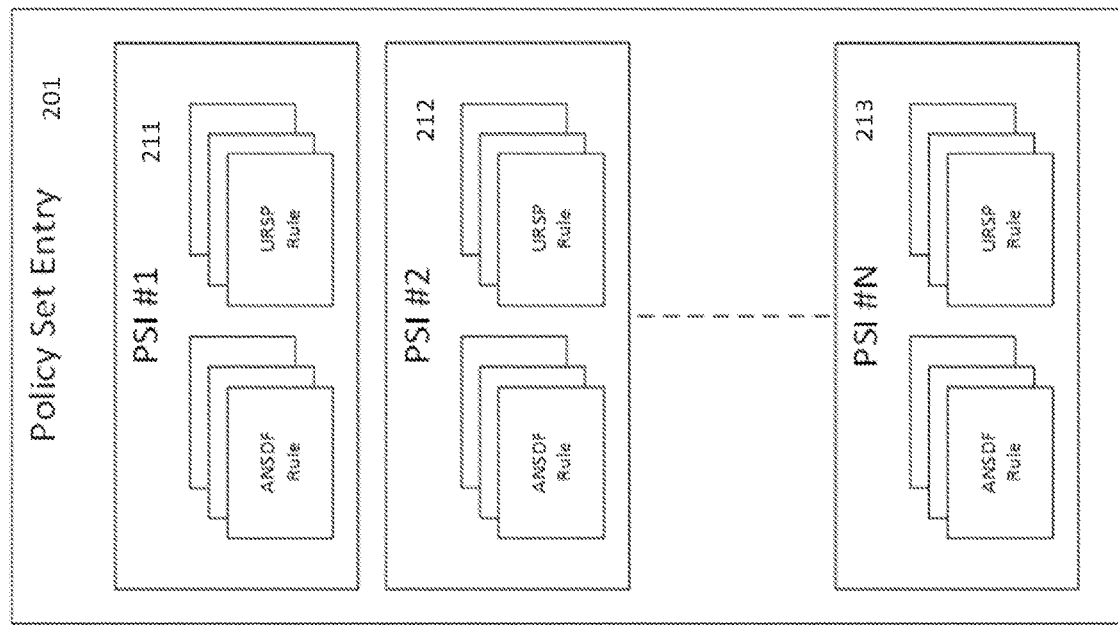
FIG. 2 shows a Policy Set Entry.

FIG. 2 shows a representation of how policy information is stored on the UE 200. The Network sends policy information to the UE with PSI granularity. In other words, a single PSI is the smallest amount of policy information that the network can send to the UE and is the smallest amount of policy information that the UE can reject. A PSI can contain as little as one ANDSP rule or one URSP rule. In the example of FIG. 2, Policy Set Entry 201 comprising PSI #1 211, PSI #2 212, and PSI #N 213.

Packet Flow Description Function (PFDF) and PFDs are described herein. The Rel-16 5G System provides APIs that allow an AF to configure Packet Flow Descriptions (PFDs) via the Packet Flow Description Function (PFDF). PFDF is a functionality within the NEF which provides PFD Management Service to network functions in the 5GC. The Packet Flow Description Function (PFDF) provides PFDs associated with one or more Application Identifiers and allows NF consumers to subscribe to and unsubscribe from the notification of changes of PFDs for Application Identifier.

The PFDs contain application detection rules provided by a 3rd party service provider. These rules enable the detection of application traffic via IP filters or with other granularities, e.g. via URLs that need to be matched (or domain names, or protocol, as detailed in TS 29.551, clause 5.6.2.5).

TABLE 5

PFD Content

| Attribute name | Data type | P | Cardinality | Description | Applicability |
| --- | --- | --- | --- | --- | --- |
| pfdId | string | C | 0 . . . 1 | Identifies a PDF of an application identifier. If PartialUpdate feature is supported during PFD change event subscription, this attribute may be provided by the PFDF. | |
| flowDescriptions | array(string) | O | 1 . . . N | Represents a 3-tuple with protocol, server ip and server port for UL/DL application traffic. (NOTE) | |
| urls | array(string) | O | 1 . . . N | Indicates a URL or a regular expression which is used to match the significant parts of the URL. (NOTE) | |

TABLE 5-continued

PFD Content

| Attribute name | Data type | P | Cardinality | Description | Applicability |
|---|---|---|---|---|---|
| domainNames | array(string) | O | 1 ... N | Indicates an FQDN or a regular expression as a domain name matching criteria. (NOTE) | |
| dnProtocol | DomainName Protocol | C | 0 ... 1 | Indicates the additional protocol and protocol field for domain names to be matched, it may only be provided when domainNames attribute is present. | DomainNameProtocol |

(NOTE):
If a PFD contains multiple filter types, the PFD is only matched when every filter type contained in the PFD has a matching value.

Consider an IoT UE being used for a variety of home automation functionalities including flood alarms. An IoT UE in such a scenario is likely to have long periods of inactivity e.g. between home automation control activities. Moreover, the overwhelming majority of communications supported are not critical, and therefore have low QoS requirements. However, for major events such as flood or fire alarms, the communications require a high level of QoS.

The Application Service Provider requirements may comprise:

First, paying for network services reflecting that low QoS values are required most of the time.

Second, tailoring network services such that the stringent QoS requirements are applied only to a limited amount of traffic for the alarms.

Third, tailoring its end-user service such that the traffic detection rule for the alarm traffic can be re-configured, e.g. by changing the destination URL.

It is observed that the Core Network can be configured to detect the properties of a flow (e.g. DPI) and then change the QoS of a flow. For example, an Application Server Provider may provide APIs that allow an AF to configure Packet Flow Descriptions (PFDs) via the NEF (PFDF). The PFD contains application detection rules provided by the 3rd party service provider or Application Service Providers (ASPs). These rules enable the detection of application traffic via IP filters or with other granularities, e.g. via URLs that need to be matched (or domain names, protocol, as detailed in 3GPP TS 29.551, clause 5.6.2.5). Once configured, PFDs are distributed from the NEF (PFDF) to other functions in the 5GS (e.g. SMF and UPF). The PFDs are then used by the UPF to detect DL application traffic based on the ASP-provided description and to bind this traffic to different QoS Flows in the 5GS. For the UL traffic, QoS rules associated with the QoS Flows instruct the UE to direct the uplink part of the service data flow to different QoS Flows.

The traffic mapping information signaled to the UE by the SMF in the Packet Filter Sets of QoS rules is defined in TS 23.501, clause 5.7.6.2.

The problem that is addressed by the embodiments described herein is that an ASP-provided configuration that is sent to the UE cannot be fully reflected in the IP packet filter sets as defined above (e.g., the URL is not in the packet filter sets). In a scenario where traffic is initiated by the UE and the application packet filter is based on an ASP-provided description which is not set to the UE (e.g., the URL), the 5GS may not detect that new QoS treatment is required until the first packets reach the UPF. This might not be acceptable in some scenarios (e.g., in a case where the traffic from the UE is a single notification that indicates an alarm condition). For this use case, the UE may need to apply the required QoS treatment for the first UL packet so that the alarm message may receive the required QoS treatment when it is sent over the air.

The core network (CN) can be configured to detect the properties of a flow (e.g., deep packet inspection (DPI)) and then may change the QoS of a flow. However, there is no way to configure the UE to perform a similar operation. Therefore, the problem is how to configure the UE to detect and apply the required QoS treatment to UL traffic, so that the UE does not need to rely on the network to detect that the QoS treatment that is required by a flow has changed. As described above, this is especially important in scenarios where a mobile originated event causes the required QoS to change, and the first packet(s) that are sent by the UE require new QoS treatment.

The embodiments described herein comprise techniques for providing fine-grained QoS rules within UE Policies.

In accordance with one embodiment, a network entity may receive triggers from other NFs or AFs to update the UE's Policies with parameters based on $3^{rd}$ party input, derive fine-grained QoS rules and corresponding QoS Profiles, and deliver them to the UE using UE Policy container via NAS. The fine-grained rules may include, for example: a destination FQDN or URL, an Application ID, an URSP precedence value, etc. The fine-grained rules may also provide mechanisms for time gating or volume gating filter type.

The UE may request new QoS treatment resulting in a UE Policy update and may use the information in the fine-grained QoS rules when establishing or modifying a PDU Session to apply QFI marking.

Fine-grained QoS rules are described herein. In order to support the proposed techniques for providing fast QoS Rule changes for high-priority MO Data, the QoS rules currently defined by 3GPP are proposed to be enhanced so that the traffic detection rules that are applied at the UE may be more fine grained, for example, they may be based on a destination FQDN or URL, an Application ID, an URSP precedence value, etc.

Some embodiments of these enhancements are exemplified below enhancing the QoS rule format currently defined by 3GPP in TS 24.501 clause 9.11.4.13.

TABLE 6

QoS rules information element

QoS rule identifier (octet 4)
The QoS rule identifier field is used to identify the QoS rule.
Bits
8 7 6 5 4 3 2 1
0 0 0 0 0 0 0 0 no QoS rule identifier assigned
0 0 0 0 0 0 0 1 QRI 1
to
1 1 1 1 1 1 1 1 QRI 255
The network may not set the QRI value to 0.
QoS rule precedence (octet m + 1)
The QoS rule precedence field is used to specify the precedence of the QoS rule among all QoS
rules (both the signaled QoS rules as described in subclause 6.2.5.1.1.2 and the derived QoS
rules as described in subclause 6.2.5.1.1.3) associated with the PDU session of the QoS flow.
This field includes the binary coded value of the QoS rule precedence in the range from 0 to
255 (decimal). The higher the value of the QoS rule precedence field, the lower the precedence
of that QoS rule is. For the "delete existing QoS rule" operation, the QoS rule precedence value
field may not be included. For the "create new QoS rule" operation, the QoS rule precedence
value field may be included.
The value 80 (decimal) is reserved.
Segregation bit (bit 7 of octet m + 2) (see NOTE 1)
In the UE to network direction the segregation bit indicates whether the UE is requesting the
network to bind service data flows described by the QoS rule to a dedicated QoS Flow and it is
encoded as follows. In the network to UE direction this bit is spare.
Bit
7
0 Segregation not requested
1 Segregation requested
QoS flow identifier (QFI) (bits 6 to 1 of octet m + 2) (see NOTE 1)
The QoS flow identifier (QFI) field contains the QoS flow identifier.
Bits
6 5 4 3 2 1
0 0 0 0 0 0 no QoS flow identifier assigned
0 0 0 0 0 1 QFI 1
to
1 1 1 1 1 1 QFI 63
The network may not set the QFI value to 0.
For the "delete existing QoS rule" operation, the QoS flow identifier value field may not be
included. For the "create new QoS rule" operation, the QoS flow identifier value field may be
included.
DQR bit (bit 5 of octet 7)
The DQR bit indicates whether the QoS rule is the default QoS rule and it is encoded as
follows:
Bit
5
0 the QoS rule is not the default QOS rule.
1 the QoS rule is the default QoS rule.
Rule operation code (bits 8 to 6 of octet 7)
Bits
8 7 6
0 0 0 Reserved
0 0 1 Create new QoS rule
0 1 0 Delete existing QoS rule
0 1 1 Modify existing QoS rule and add packet filters
1 0 0 Modify existing QoS rule and replace all packet filters
1 0 1 Modify existing QoS rule and delete packet filters
1 1 0 Modify existing QoS rule without modifying packet filters
Number of packet filters (bits 4 to 1 of octet 7)
The number of packet filters contains the binary coding for the number of packet filters in the
packet filter list. The number of packet filters field is encoded in bits 4 through 1 of octet 7
where bit 4 is the most significant and bit 1 is the least significant bit. For the "delete existing
QoS rule" operation and for the "modify existing QoS rule without modifying packet filters"
operation, the number of packet filters may be coded as 0. For the "create new QoS rule"
operation and the "modify existing QoS rule and replace all packet filters" operation, the
number of packet filters may be greater than or equal to 0 and less than or equal to 15. For all
other operations, the number of packet filters may be greater than 0 and less than or equal to 15.
Packet filter list (octets 8 to m)
The packet filter list contains a variable number of packet filters.
For the "delete existing QoS rule" operation, the length of QoS rule field is set to one.
For the "delete existing QoS rule" operation and the "modify existing QoS rule without
modifying packet filters" operation, the packet filter list may be empty.
For the "modify existing QoS rule and delete packet filters" operation, the packet filter list may
contain a variable number of packet filter identifiers. This number may be derived from the
coding of the number of packet filters field in octet 7.
For the "create new QoS rule" operation and for the "modify existing QoS rule and replace all
packet filters" operation, the packet filter list may contain 0 or a variable number of packet
filters. This number may be derived from the coding of the number of packet filters field in
octet 7.

TABLE 6-continued

QoS rules information element

For the "modify existing QoS rule and add packet filters" operation, the packet filter list may contain a variable number of packet filters. This number may be derived from the coding of the number of packet filters field in octet 7.
Each packet filter is of variable length and consists of
a packet filter direction (2 bits);
a packet filter identifier (4 bits);
the length of the packet filter contents (1 octet); and
the packet filter contents itself (variable amount of octets).
The packet filter direction field is used to indicate for what traffic direction the filter applies.
Bits
6 5
0 0 reserved
0 1 downlink only
1 0 uplink only
1 1 bidirectional (see NOTE)
The packet filter identifier field is used to identify each packet filter in a QoS rule. The least significant 4 bits are used.
The length of the packet filter contents field contains the binary coded representation of the length of the packet filter contents field of a packet filter. The first bit in transmission order is the most significant bit.
The packet filter contents field is of variable size and contains a variable number (at least one) of packet filter components. Each packet filter component may be encoded as a sequence of a one octet packet filter component type identifier and a fixed length packet filter component value field. The packet filter component type identifier may be transmitted first.
In each packet filter, there may not be more than one occurrence of each packet filter component type. Among the "IPv4 remote address type" and "IPv6 remote address/prefix length type" packet filter components, only one may be present in one packet filter. Among the "IPv4 local address type" and "IPv6 local address/prefix length type" packet filter components, only one may be present in one packet filter. Among the "single local port type" and "local port range type" packet filter components, only one may be present in one packet filter. Among the "single remote port type" and "remote port range type" packet filter components, only one may be present in one packet filter. If the "match-all type" packet filter component is present in the packet filter, no other packet filter component may be present in the packet filter and the length of the packet filter contents field may be set to one.
The term local refers to the UE and the term remote refers to an external network entity.
Packet filter component type identifier
Bits
8 7 6 5 4 3 2 1
0 0 0 0 0 0 0 1 Match-all type
0 0 0 1 0 0 0 0 IPv4 remote address type
0 0 0 1 0 0 0 1 IPv4 local address type
0 0 1 0 0 0 0 1 IPv6 remote address/prefix length type
0 0 1 0 0 0 1 1 IPv6 local address/prefix length type
0 0 1 1 0 0 0 0 Protocol identifier/Next header type
0 1 0 0 0 0 0 0 Single local port type
0 1 0 0 0 0 0 1 Local port range type
0 1 0 1 0 0 0 0 Single remote port type
0 1 0 1 0 0 0 1 Remote port range type
0 1 1 0 0 0 0 0 Security parameter index type
0 1 1 1 0 0 0 0 Type of service/Traffic class type
1 0 0 0 0 0 0 0 Flow label type
1 0 0 0 0 0 0 1 Destination MAC address type
1 0 0 0 0 0 1 0 Source MAC address type
1 0 0 0 0 0 1 1 802.1Q C-TAG VID type
1 0 0 0 0 1 0 0 802.1Q S-TAG VID type
1 0 0 0 0 1 0 1 802.1Q C-TAG PCP/DEI type
1 0 0 0 0 1 1 0 802.1Q S-TAG PCP/DEI type
1 0 0 0 0 1 1 1 Ethertype type
1 0 0 0 1 0 0 0 Application ID type
1 0 0 0 1 0 0 1 Destination URL type
1 0 0 0 1 0 1 1 Destination FQDN type
1 0 0 0 1 1 0 0 URSP rule type
1 0 0 0 1 1 0 1 DSCP marking type
1 0 0 0 1 1 1 0 Domain Name type
1 0 0 0 1 1 1 1 Domain Name Protocol type
All other values are reserved.
The description and valid combinations of packet filter component type identifiers in a packet filter are defined in 3GPP TS 23.501 [8].
For "match-all type", the packet filter component may not include the packet filter component value field.
For "IPv4 remote address type", the packet filter component value field may be encoded as a sequence of a four octet IPV4 address field and a four octet IPv4 address mask field. The IPV4 address field may be transmitted first.
For "IPv4 local address type", the packet filter component value field may be encoded as defined for "IPv4 remote address type".
For "IPv6 remote address/prefix length type", the packet filter component value field may be encoded as a sequence of a sixteen octet IPV6 address field and one octet prefix length field.

TABLE 6-continued

QoS rules information element

The IPV6 address field may be transmitted first.
For "IPV6 local address/prefix length type", the packet filter component value field may be
encoded as defined for "IPv6 remote address/prefix length".
For "protocol identifier/Next header type", the packet filter component value field may be
encoded as one octet which specifies the IPv4 protocol identifier or Ipv6 next header.
For "single local port type" and "single remote port type", the packet filter component value
field may be encoded as two octets which specify a port number.
For "local port range type" and "remote port range type", the packet filter component value
field may be encoded as a sequence of a two octet port range low limit field and a two octet
port range high limit field. The port range low limit field may be transmitted first.
For "security parameter index", the packet filter component value field may be encoded as four
octets which specify the IPSec security parameter index.
For "type of service/traffic class type", the packet filter component value field may be encoded
as a sequence of a one octet type-of-service/traffic class field and a one octet type-of-
service/traffic class mask field. The type-of-service/traffic class field may be transmitted first.
For "flow label type", the packet filter component value field may be encoded as three octets
which specify the IPV6 flow label. The bits 8 through 5 of the first octet may be spare whereas
the remaining 20 bits may contain the IPV6 flow label.
For "destination MAC address type" and "source MAC address type", the packet filter
component value field may be encoded as 6 octets which specify a MAC address.
For "802.1Q C-TAG VID type", the packet filter component value field may be encoded as two
octets which specify the VID of the customer-VLAN tag (C-TAG). The bits 8 through 5 of the
first octet may be spare whereas the remaining 12 bits may contain the VID.
For "802.1Q S-TAG VID type", the packet filter component value field may be encoded as two
octets which specify the VID of the service-VLAN tag (S-TAG). The bits 8 through 5 of the
first octet may be spare whereas the remaining 12 bits may contain the VID.
For "802.1Q C-TAG PCP/DEI type", the packet filter component value field may be encoded
as one octet which specifies the 802.1Q C-TAG PCP and DEI. The bits 8 through 5 of the octet
may be spare, the bits 4 through 2 contain the PCP and bit 1 contains the DEI.
For "802.1Q S-TAG PCP/DEI type", the packet filter component value field may be encoded as
one octet which specifies the 802.1Q S-TAG PCP. The bits 8 through 5 of the octet may be
spare, the bits 4 through 2 contain the PCP and bit 1 contains the DEI.
For "ethertype type", the packet filter component value field may be encoded as two octets
which specify an ethertype.
For "Application ID type", the packet filter component value field may be encoded as two
octets which specify an Application ID.
For "Destination URL type", the packet filter component value field may be encoded as a
sequence of one octet destination URL length field and a destination URL value of variable
size.
For "Destination FQDN" type, the traffic descriptor component value field may be encoded as
a sequence of one octet destination FQDN length field and a destination FQDN value of
variable size.
For "URSP Rule type", the packet filter component value field may be encoded as one octet
which specifies the precedence value of an URSP Rule.
For "DSCP marking type", the packet filter component value field may be encoded as a
sequence of one octet length of DSCP marking field and a DSCP marking of variable size.
For "Domain Name type, the traffic descriptor component value field may be encoded as a
sequence of one octet length of Domain Name field and a destination Domain Name of variable
size
For "Domain Name protocol type", the packet filter component value field may be encoded as
one octet When the Packet filter component type identifier indicates "Application ID" type and the UE detects traffic that matches the Application ID that is provided in the Packet Filter Component, the UE may apply the QoS Rule. The Applications that run in the UE may have been associated with "Application IDs" by the operating system. The UE may have been provided with rules for how to identify the "Application ID" that is associated with a piece of uplink traffic. The rules for how to identify the "Application ID" that is associated with a piece of uplink traffic may have been received by the UE, from the network, in a NAS message from the SMF or PCF.

When the Packet filter component type identifier indicates "Destination URL" type and the UE detects traffic that includes the Destination URL that is provided in the Packet Filter Component, the UE may apply the QoS Rule.

When the Packet filter component type identifier indicates "Destination FQDN" type, and the UE detects traffic that includes the Destination FQDN that is provided in the Packet Filter Component, the UE may apply the QoS Rule.

When the Packet filter component type identifier indicates "URSP Rule Precedence" type, and the UE detects traffic is associated with the same URSP Rule Precedence that is provided in the Packet Filter Component, the UE may determine to apply the QoS Rule. Alternatively, the component type identifier could indicate an identifier that is associated with a URSP Rule (e.g. a PSI) and when the UE detects traffic is associated with the same URSP Rule identifier that is provided in the Packet Filter Component, the UE may apply the QoS Rule.

Alternatively, the Packet filter component type identifier may indicate "DSCP Matching" type. When the component type identifier indicates "DSCP Matching", the UE may apply the QoS rule when the user plane packet from the UE Application includes a DSCP marking that matches the DSCP Marking that is included in the Packet Filter Component.

Alternatively, the Packet filter component type identifier may indicate "Domain Name Matching" type. When the component type identifier indicates "Domain Name Matching", the UE may apply the QoS rule when the user plane packet from the UE Application includes the Domain Name that matches the DSCP Marking that is included in the Packet Filter Component.

Alternatively, the Packet filter component type identifier may indicate "Domain Name Protocol Matching" type. When the component type identifier indicates "Domain Name Protocol Matching", the UE may apply the QoS rule when the user plane packet from the UE Application uses the Domain Name Protocol that matches the DSCP Marking that is included in the Packet Filter Component. Examples of Domain Name Protocols are DNS and TLS.

Additional enhancements that can be brought to the QoS rules for finer granularity are techniques for gating the use of the traffic detection rules, e.g. time gating or volume gating. An example implementation (not shown in the encoding example above) is to include a "Constraints" field in the QoS rule, where the constraints enumerated may in include "Time gating" and "Volume gating". Similarly to the implementation of the filters, an implementation of the constraints may include a type and one or more values. For example, for constraint type "Volume gating" the value field may provide the maximum number of packets for which the QoS rule applies, after which the rule becomes inactive. Similarly, for constraint type "Time gating" the value field may provide a timer value. Alternative implementations may provide constraint parameters (e.g. time or data volume boundaries) outside the QoS rule structure. For example, the timer applied may be the same as the RQ timer being applied for reflective QoS. The RQ timer is provided to the UE in the PDU establishment accept message.

Harmonization of fine-grained QoS rules between the UE and the CN is described herein. The UE delivery via SMF using a PCF-initiated SM Policy Association Modification is described herein. Service Providers may provide fine-grained QoS rules and/or precursor or related information through third-party AFs via the N5 reference point to the PCF. 3GPP 29.514 details the Npcf functionality exposed by PCF over N5 which allows third-party AFs to provide policies (i.e., PCC rules), which include specific user plane paths for the requested traffic, as well as required service QoS and alternative QoS profiles, by invoking Npcf_PolicyAuthorization services.

The proposed parameters for defining and provisioning the fine-grained QoS rules disclosed herein may be provided to the PCF, for example, by a third-party AF using the Npcf_PolicyAuthorization procedures, and as such be included in the PCC rules structure. For example, the AF may use the Npcf_PolicyAuthorization API (or similar APIs over N5) with several alternatives as follows:

In one example, the AF may request the PCF to create an Individual Application Session Context resource with an the AppSessionContextReqData structure enhanced via an "AF QoS Influence" field (e.g., afQoSInfluence data structure). The new afQoSInfluence in the AppSessionContextReqData may comprise the Fine grained QoS rules as proposed in Table 3. These parameters provide the AF the capability to create fine-grained QoS rules which may then be forwarded by PCF to SMF along with the policies derived by PCF from PCC rules.

An afQoSInfluence structure derived directly from Table 3 would include the QFI mapping, as well as derivation of other parameters such as ARP, RQI, etc. If providing the latter parameters is a capability that the MNO does not expose to $3^{rd}$ parties, a variant of this alternative would allow the AF to provide a subset of the Table 3 parameters (i.e. without QFI, for example) and incorporate parts of the next alternative In another example, the AF may invoke the API with enhanced MediaComponent and MediaSubComponent data types that provide the traffic detection parameters in Table 3 for service data flow detection corresponding to the fine-grained QoS rules (e.g. Application ID, Destination URL, Destination FQDN, URSP rule, DSCP marking, Domain Name, Domain Name Protocol). In this example, the parameters provided by the AF may become part of the enhanced MediaComponent description, which is then used by the PCF to derive QoS rule settings as described in 3GPP TS 29.513, along with those from other PCC rule parameters. The resulting policies may then be forwarded by PCF to SMF.

An alternative to using the N5 Npcf_PolicyAuthorization API is for a third-party AF to use the PFD management procedures in 3GPP TS 29.551. In this alternative, the PFD description may also be enhanced by adding newly proposed Table 3 parameters (e.g. associated URSP rule for traffic description) to the PFD descriptions. In addition, the PCF functionality of QoS mapping described in 3GPP TS 29.513, is enhanced with rules or algorithms for deriving fine-grained QoS rule policies from enhanced PFDs.

Figure 3:
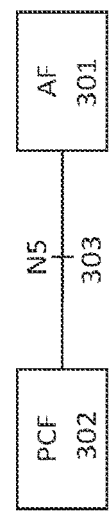
FIG. 3 shows an example of AF to PCF communication via N5.

FIG. 3 shows an example AF to PCF communication 300. In the example of FIG. 3, AF 301 communicates with the PCF 302 via the N5 interface 303. TS 29.512 describes how the PCF 302 may use information provided by the AF 301, in conjunction with information from other NFs (e.g., UDR, AMF, NWDAF, SMF) and parameters derived based on 3GPP TS 29.513 to provide policies (e.g., for service data flow detection and QoS handling, among others) to the SMF. These policies are used by SMF to:

derive rules for and provide them to UPF as defined in 3GPP TS 29.244;
derive QoS rules for and provide them to the UE;
derive QoS Profiles for and provide them to the access network;
bind service data flows to QoS flow as defined in 3GPP TS 29.513.

The following describes how the PCF derived fine-grained QoS rules and corresponding QoS Profiles may be provided via the SMF to the UE and RAN, respectively, through Session Management procedures.

Figure 4:
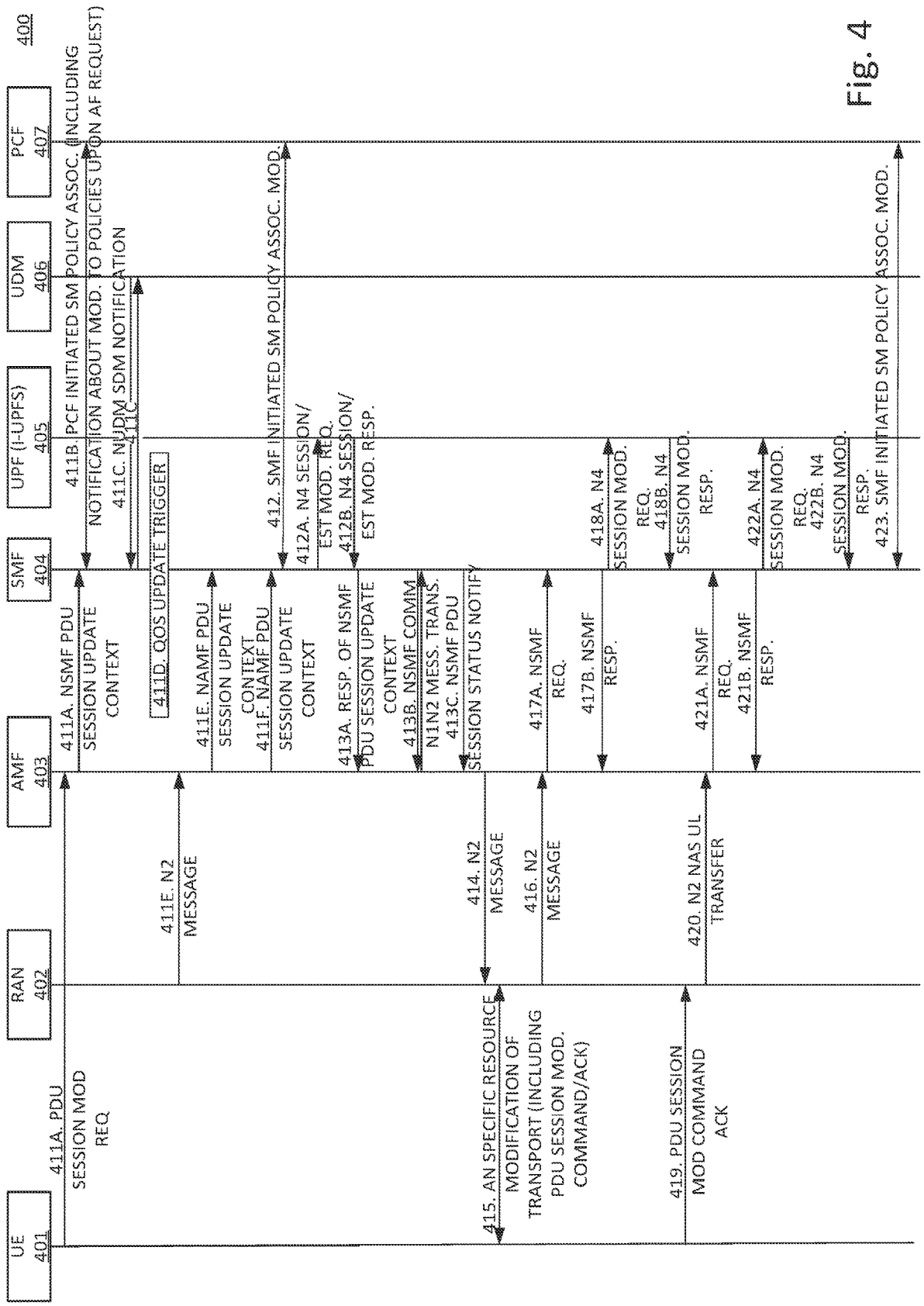
FIG. 4 shows an example PDU session modification procedure.

FIG. 4 shows the PDU session modification procedure 400. FIG. 4 shows the UE 401, RAN 402, AMF 403, SMF 404, UPF 405, UDM 406, and PCF 407. The example procedure of FIG. 4 includes several triggering options from the UE 401 (as shown in step 411a), via SMF 404 (as shown in steps 411b, 411c and 411d), or from RAN 402/AMF 403 (as shown in steps 411e and 411f). The following description assumes triggering corresponding to step 411b, which may be used to notify the SMF 404 about the modification of policies, e.g., upon AF requests, as described in the use case. The steps of the procedure of FIG. 4 correspond to the procedure of 3GPP TS 23.502 clause 4.3.3.2, with several enhancements.

At step 411b, the PCF 407 may initiate an SM Policy Association Modification procedure to notify the SMF 404 about the modification of policies upon an AF request, for example, the AF providing information leading to updates of the QoS related PCC.

At step 412, the SMF 404 may initiate an SM policy association modification. At step 412a, the N4 session establishment/modification may be sent from the SMF 404 to the UPF 405. At step 412b, the N4 session establishment/modification response may be sent from the UPF 405 to the SMF 404.

At step 413a, the response of the Nsmf_PDUSession_UpdateSMContext may be sent from the SMF 404 to the AMF 403.

At step 413b, the SMF 404 may provide the N2 and N1 information updating the QoS Profiles and QoS rules. The SMF may invoke the Namf_Communication_N1N2MessageTransfer including an N1 SM container and an N2 SM information as follows:

The N2 SM information may, for example, comprise: PDU Session ID, QFI(s), QoS Profile(s), (Alternative QoS Profile(s)), Session-AMBR, (CN Tunnel Info(s)), QoS Monitoring indication, QoS Monitoring reporting frequency, (TSCAI(s)).

The N2 SM information may carry information provided to the (R)AN via the AMF and may include the QoS profiles and the corresponding QFIs to notify the (R)AN that one or more QoS flows were added or modified.

The N1 SM container information may, for example, comprise: PDU Session Modification Command (PDU Session ID, QoS rule(s), QoS Flow level QoS parameters if needed for the QoS Flow(s) associated with the QoS rule(s), QoS rule operation and QoS Flow level QoS parameters operation, Session-AMBR.

The N1 SM container may carry the PDU Session Modification Command that the AMF provides to the UE. It may include the fine-grained QoS rules, associated QoS Flow level parameters and may notify the UE that the fine-grained QoS rules are to be added.

The QoS Rules in the N1 container that was provided by the SMF to the UE (via the AMF and RAN) may include enhanced detection rules as described herein.

At step 413c, the SMF 404 may send the Nsmf_PDUSession_SMContextStatusNotify to the AMF 403.

At step 414, the AMF 403 may send the N2 message to the RAN 402. The N2 message may comprise, for example, the N2 SM information received from the SMF 404 or the NAS message (the PDU Session ID, the N1 SM container (the PDU Session Modification Command))). The N2 information may allow RAN QoS Profile information to be synchronized with the QoS Flow level parameters associated with the fine-grained QoS rules provided to the UE 401.

At step 415, the N1 SM container received by the RAN 402 in step 414 may be transported transparently to the UE 401, providing the fine-grained QoS Rules based on the AF's input.

At step 416, the N2 message may be sent from the RAN 402 to the AMF 403. At step 417a, the Nsmf_PDUSession_UpdateSMContext Request may be sent from the AMF 403 to the SMF 404. At step 417b, the Nsmf_PDUSession_UpdateSMContext Response may be sent from the SMF 404 to the AMF 403. At step 418a, the N4 Session Modification Request may be sent from the SMF 404 to the UPF 405. At step 418b, the N4 Session Modification Response may be sent from the UPF 405 to the SMF 404. At step 419, a PDU Session Modification Command Ack may be sent from the UE 401 to the RAN 402. At step 420, an N2 NAS uplink transfer may be sent from the RAN 402 to the AMF 403. At step 421a, the Nsmf_PDUSession_UpdateSMContext Request may be sent from the AMF 403 to the SMF 404. At step 421b, the Nsmf_PDUSession_UpdateSMContext Response may be sent from the SMF 404 to the AMF 403. At step 422a, the N4 Session Modification Request may be sent from the SMF 404 to the UPF 405. At step 422b, the N4 Session Modification Response may be sent from the UPF 405 to the SMF 404. At step 423, the SMF Initiated SM Policy Association Modification may be made.

A PDU Session Modification procedure may provide the fine-grained QoS information to the UE and RAN as described above also if the procedure is initiated via one of the other triggers in step 411, as long as the SDF has received the updated QoS information from an AF.

Similarly, an PDU Session Establishment request procedure, described in 3GPP 23.502 clause 4.3.2, may provide a mechanism for the fine-grained QoS information to be delivered to the UE and RAN. In step 11 of the PDU Session Establishment request procedure (Namf-Communication_N1N2_MessageTransfer), the SMF provides to AMF N2 information including the QoS profiles and the corresponding QFIs which is then forwarded to RAN. The SMF also provides in step 11 N1 information that the AMF forwards to the UE in the PDU Session Establishment Accept. The N1 message includes QoS Rules and associated QoS Flow level parameters, including the fine-grained QoS rules.

After the UE and RAN are configured as described above, the UE may send UL packets matching the fine-grained QoS rules to the DN because:

The UE may have a fine grained QoS rule used to determine the QoS Flow matching the UL traffic of interest to the DRB (Data Radio Bearer) identified by the QFI to the gNB;

The RAN may know the addressing information (IP address of the UPF and the TEID_cn of the UE) for forwarding UL traffic to the UPF and DN. In addition, the RAN also has the QoS Profiles corresponding to the fine-grained QoS rules used by the UE; and Application-level delivery with UE-initiated PDU session modification Another method of harmonizing fine-grained QoS rules provided by third-party service providers between the UE and the network is by using application level signaling (i.e., over-the-top") to provide some of the information from the AF to the UE.

Given the special handling required by the UL data service flow, a service provider can provide the UE with the descriptions of the service data flows as detailed and as specifically as desired at the application level. Once the traffic description is provided to the UE, e.g., downloaded, they may be addressed by using corresponding Application IDs.

Figure 5:
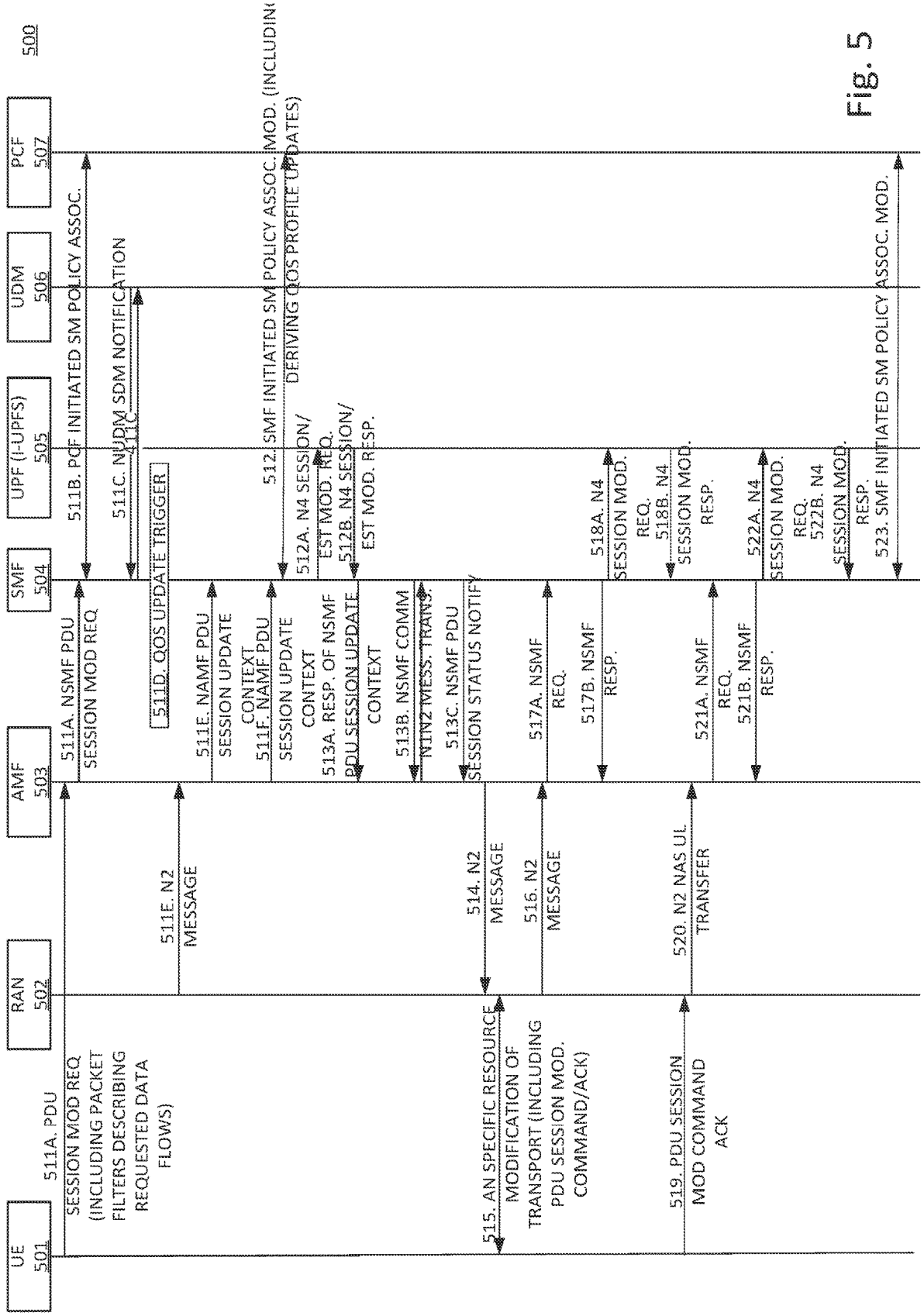
FIG. 5 shows an example UE-initiated PDU session modification (after application-level delivery)

FIG. 5 shows an example UE-initiated PDU session modification (after application-level delivery) 500. FIG. 5 shows the UE 501, RAN 502, AMF 503, SMF 504, UPF 505, UDM 506, and PCF 507. The example procedure of FIG. 5 shows how in a UE-initiated PDU session modification the UE can request a specific QoS handling by including one of the following: the requested QoS rules IE, the requested QoS flow descriptions IE, or both IEs for the specific QoS handling. Alternatively, the UE can request specific QoS handling via a PDU session establishment request when the UE is provisioned with application level configurations on QoS handling prior to establishing the PDU session. The example procedure of FIG. 5 includes several triggering options from the UE 501 (as shown in step 511a), via SMF 504 (as shown in steps 511b, 511c and 511d), or from RAN 502/AMF 503 (as shown in steps 511e and 511f). The following description assumes triggering corresponding to step 511a.

The QoS rules IE in the PDU Session Modification request of step 511a may include the packet filters that describe the service data flows requested by the UE. The specific QoS parameters requested by the UE are specified in the QoS flow descriptions IE. If the UE requests the network to bind specific service data flows to a dedicated QoS flow, the UE may create a new QoS rule by setting the rule operation code to "Create new QoS rule" and may set the segregation bit to "Segregation requested" for the corresponding QoS rule in the QoS rules IE. The UE sets the QRI values to "no QoS rule identifier assigned" in the requested QoS rules IE, if the QoS rules are newly created; otherwise, the UE may set the QRI values to those of the existing QoS rules for which the specific QoS handling applies. The UE may set the QFI values to "no QoS flow identifier assigned" in the requested QoS flow descriptions IE, if the QoS flow descriptions are newly created; otherwise, the UE may set the QFI values to the QFIs of the existing QoS flow descriptions for which the specific QoS handling applies.

At step 512, the SMF derives QoS Profile updates required to implement the requested QoS rule at the RAN and the corresponding PCC rule updates required. The SMF initiates SM Policy Association Modification procedure to modifies the PCF policies accordingly, if allowed. At step 512*a*, the N4 session establishment/modification may be sent from the SMF 504 to the UPF 505. At step 512*b*, the N4 session establishment/modification response may be sent from the UPF 505 to the SMF 504.

At step 513*a*, the response of the Nsmf_PDUSession_UpdateSMContext may be sent from the SMF 504 to the AMF 503.

At step 513*b*, the SMF 505 may provide the N2 and N1 information updating the QoS Profiles and QoS rules. The SMF may invoke the Namf_Communication_N1N2MessageTransfer including an N1 SM container and an N2 SM information as follows:

The N2 SM information may, for example, comprise: PDU Session ID, QFI(s), QoS Profile(s), Alternative QoS Profile(s), Session-AMBR, CN Tunnel Info(s), QoS Monitoring indication, QoS Monitoring reporting frequency, TSCAI(s). The N2 SM information may include the QoS profiles and the corresponding QFIs.

The N1 SM container information may, for example, comprise: PDU Session Modification Command (PDU Session ID, QoS rule(s), QoS Flow level QoS parameters if needed for the QoS Flow(s) associated with the QoS rule(s), QoS rule operation and QoS Flow level QoS parameters operation, Session-AMBR). The N1 SM container may carry the PDU Session Modification Command that acknowledges the fine-grained QoS rules to be added at UE request.

At step 514, the AMF 503 may send the N2 message to the RAN 502. The N2 message may comprise, for example, the N2 SM information received from the SMF 504 or the NAS message (N2 SM information received from SMF, NAS message (PDU Session ID, N1 SM container (PDU Session Modification Command))). The N2 information may allow the RAN QoS Profile information to be synchronized with the QoS Flow level parameters associated with the fine-grained QoS rules at the UE.

At step 515, the AN-specific resource modification of transport (including the PDU Session Modification Command/ACK) may be sent from the UE 501 to the RAN 502. At step 516, the N2 message may be sent from the RAN 502 to the AMF 503. At step 517*a*, the Nsmf_PDUSession_UpdateSMContext Request may be sent from the AMF 503 to the SMF 504. At step 517*b*, the Nsmf_PDUSession_UpdateSMContext Response may be sent from the SMF 504 to the AMF 503. At step 518*a*, the N4 Session Modification Request may be sent from the SMF 504 to the UPF 505. At step 518*b*, the N4 Session Modification Response may be sent from the UPF 505 to the SMF 504. At step 519, a PDU Session Modification Command Ack may be sent from the UE 501 to the RAN 502. At step 520, an N2 NAS uplink transfer may be sent from the RAN 502 to the AMF 503. At step 521*a*, the Nsmf_PDUSession_UpdateSMContext Request may be sent from the AMF 503 to the SMF 504. At step 521*b*, the Nsmf_PDUSession_UpdateSMContext Response may be sent from the SMF 504 to the AMF 503. At step 522*a*, the N4 Session Modification Request may be sent from the SMF 504 to the UPF 505. At step 522*b*, the N4 Session Modification Response may be sent from the UPF 505 to the SMF 504. At step 523, the SMF Initiated SM Policy Association Modification may be made.

Use of URSP is described herein. Another method of harmonizing fine-grained QoS rules provided by third-party Service Providers between the UE and the network is by using URSPs. URSPs are policies provided to the UE to determine how to route outgoing traffic from the UE. Traffic can be routed to an established PDU Session, can be offloaded to non-3GPP access outside a PDU Session, or can trigger the establishment of a new PDU Session.

Given that the URSP rules include a Traffic Descriptor section which can be used to identify UL traffic, a URSP rule with the traffic description for MO priority data can be available at the UE for routing purposes. For example, a URSP rule can indicate that the URSP rule applies to MO Exception Data or data that is assigned to particular access classes (e.g. High Priority Access ID's 1-2 or 11-15 or MO Exception Data which is Access Class 10).

One of the disclosed techniques for enhancing QoS rules already introduced consist in introducing a new "URSP precedence value" filter type. This type of filter allows for a QoS Rule to use the traffic description provided by the URSP rule. In other words, the precedence in the QoS Rule serves as a pointer linking the QoS Rule to one or more URSP rules. Given the increased data size required for providing a URL or domain filter, this method allows for providing fine-grained QoS rules without incurring significant signaling overhead. Alternatively, as discussed earlier, a PSI could be used to link a QoS Rule with the URSP Rule.

Note that the proposed "URSP precedence value" filter type uses the precedence value of the URSP as an index, given that they are uniquely related. Alternatively, an URSP Identity can be assigned uniquely to each URSP and used in the QoS filter instead.

Use of fine-grained QoS rules with fast QoS changes for MO data.

In use cases like those described herein, in addition to having the ability to apply fine-grained QoS rules for MO data, there is a need to be able to provide for fast QoS rule changes. This is the case, for example, when stringent QoS rules need to be applied as soon as the UE has acquired the data, which might occur while the UP connection is deactivated.

The deactivation of the UP connection of an existing PDU Session may cause the corresponding data radio bearer and N3 tunnel to be deactivated. The UP connection of different PDU Sessions can be deactivated independently when a UE is in CM-CONNECTED state (23.502 clause 5.6.8)

A UE that may need to send MO data with high priority and stringent QoS requirements may use any of the mechanisms previously described to establish a PDU session including a QoS flow with the necessary QoS treatment.

However, if such high-priority data occurs rarely, the PDU session may need to be de-activated for resource optimization purposes.

When a new MO data set is available at the UE for transmission, the UE may invoke the Service Request procedure to request the independent activation of the UP connection of the PDU Session with the necessary QoS flow.

Once the UE has a QoS rule for the high-priority data, it may apply the corresponding QFI marking just to packets that match, or to all packets that are associated with the flow. The fine-grained QoS rules may be used for a limited amount of time via a "Time gated filter type", with the time provided either in the filter or via a separate IE, e.g. similar to RQ timer.

Application Configuration is described herein. A UE Application may receive QoS Configuration information from an Application Service Provider's network application (i.e., an AF). The QoS Configuration information can indicate to the UE what packet marking the UE Application should apply to its IP Packets. The packet markings may comprise DSCP markings or a new type of marking that is specified by 3GPP. The QoS Configuration information may also provide rules to the UE Application for how to determine what marking to apply. For example, the rules may indicate that IP packets that are associated with certain Application Message Types or Resource Types should get a particular marking value. The rules may also indicate that certain marking values should be applied during certain times of day or when the UE is in certain locations.

The enhanced QoS Rules that were described above may then be used to configure the UE's protocol stack to know how to map the markings (e.g. DSCP markings) that were applied by the UE Application to QFI markings.

The benefit of configuring the Application with packet marking rules that are location dependent is that some devices might only be required to send high priority messages when in certain parts of a city, or when they are stolen and removed from an area where they are expected to operate.

The benefit of providing marking rules to the UE Application which are then re-mapped to QFI markings is that the UE Application would not need to understand QFI markings which are specific to 3GPP access technology and the network (i.e. SMF) would be able to change how application layer markings are mapped to QFI markings without marking the UE application aware of the change.

Improvement to Reflective QoS is described herein. When the UE indicates to the SMF that it supports reflective QoS, the UE may further indicate that it supports fine-grained reflective QoS. When the UE indicates to the SMF that the UE supports fine-grained reflective QoS, the SMF may provide the UE with an indication of the granularity at which Reflective QoS should be applied. For example, the SMF may indicate to the UE that the UE should reflect QoS based on matching Application Protocol, Application ID, URL, or Message Type. The UE may then not reflect QFI marking based on an IP Packet Filter and may instead reflect QFI markings based on the QFI markings that are detected in the DL packets that are associated with the same Application Protocol, Application ID, URL, or Message Type.

As used herein, "Reflecting a QFI" may refer to applying a QFI marking to an UL packet based on the QFI marking that was detected on a DL packet where the DL packet and UL packet share some characteristic.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 6A:
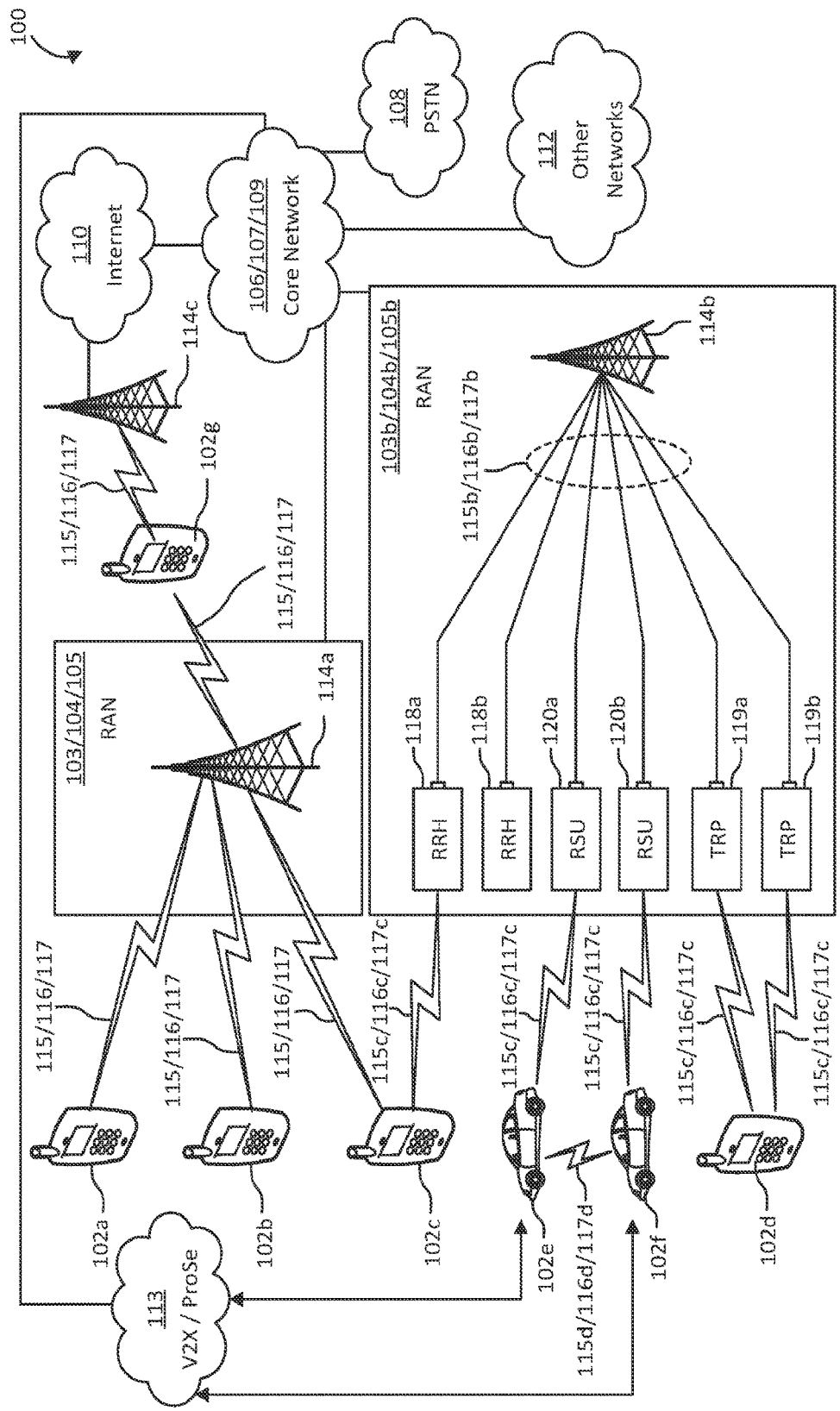
FIG. 6A illustrates one embodiment of an example communications system in which the methods and apparatuses described and claimed herein may be embodied.

FIG. 6A illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, 102*d*, 102*e*, 102*f*, and/or 102*g* (which generally or collectively may be referred to as WTRU 102), a radio access network (RAN) 103/104/105/103*b*/104*b*/105*b*, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102*a*, 102*b*, 102*c*, 102*d*, 102*e*, 102*f*, 102*g* may be any type of apparatus or device configured to operate and/or communicate in a wireless environment. Although each WTRU 102*a*, 102*b*, 102*c*, 102*d*, 102*e*, 102*f*, 102*g* is depicted in FIGS. 6A-6E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b*, TRPs (Transmission and Reception Points) 119*a*, 119*b*, and/or RSUs (Roadside Units) 120*a* and 120*b* to facilitate access to one or more communication networks, such as the core network 106/107/109, the Internet 110, the other networks 112, and/or V2X server (or ProSe function and server) 113. RRHs 118*a*, 118*b* may be any type of device configured to wirelessly interface with at least one of the WTRU 102*c*, to facilitate access to one or more communication networks, such as the core network 106/107/109, the Internet 110, and/or the other networks 112. TRPs 119*a*, 119*b* may be any type of device configured to wirelessly interface with at least one of the WTRU 102*d*, to facilitate access to one or more communication networks, such as the core network 106/107/109, the Internet 110, and/or the other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, the other networks 112, and/or V2X server (or ProSe function and server) 113. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a* and 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 6A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 6A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 6A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 6A may be configured to communicate with the base station 114a, which may employ a cellular-based radio technology, and with the base station 114c, which may employ an IEEE 802 radio technology.

Figure 6B:
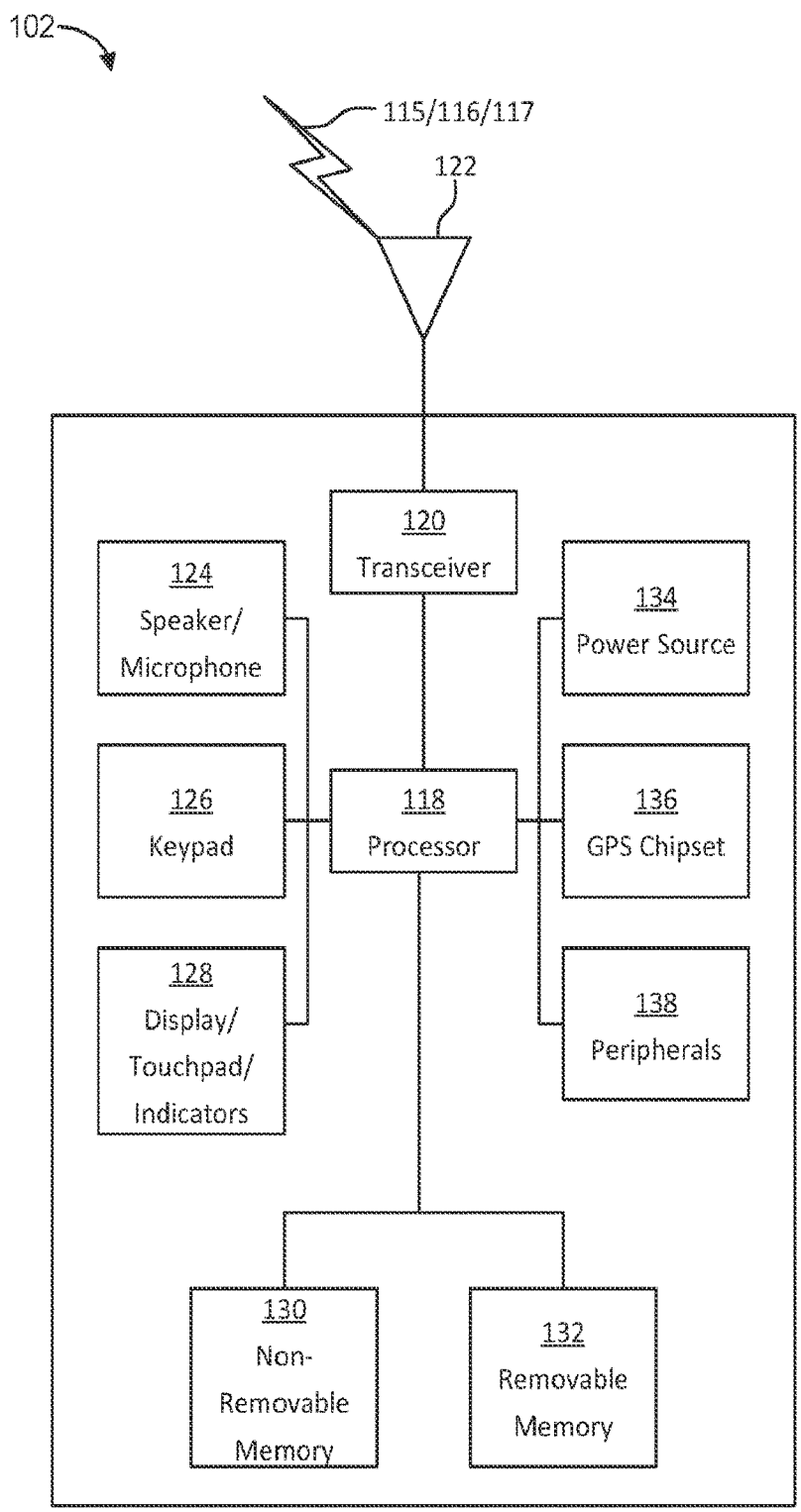
FIG. 6B is a block diagram of an example apparatus or device configured for wireless communications in accordance with the embodiments illustrated herein, such as for example, a wireless transmit/receive unit (WTRU)

FIG. 6B is a block diagram of an example apparatus or device configured for wireless communications in accordance with the embodiments illustrated herein, such as for example, a WTRU 102. As shown in FIG. 6B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 6B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 6B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 6B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 6C:
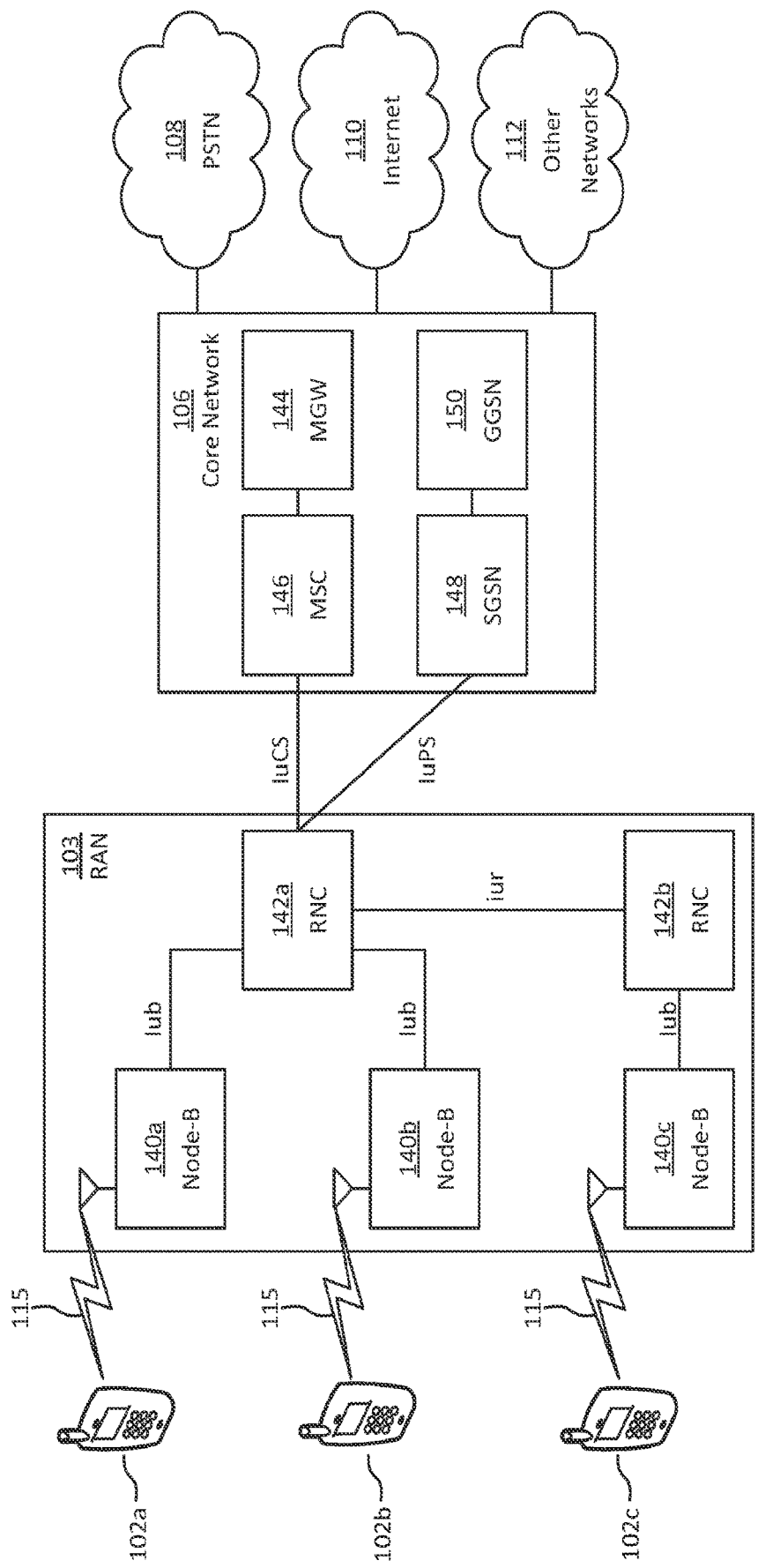
FIG. 6C is a system diagram of a RAN and a core network according to an embodiment.

FIG. 6C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 6C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 6C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 6C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 6D:
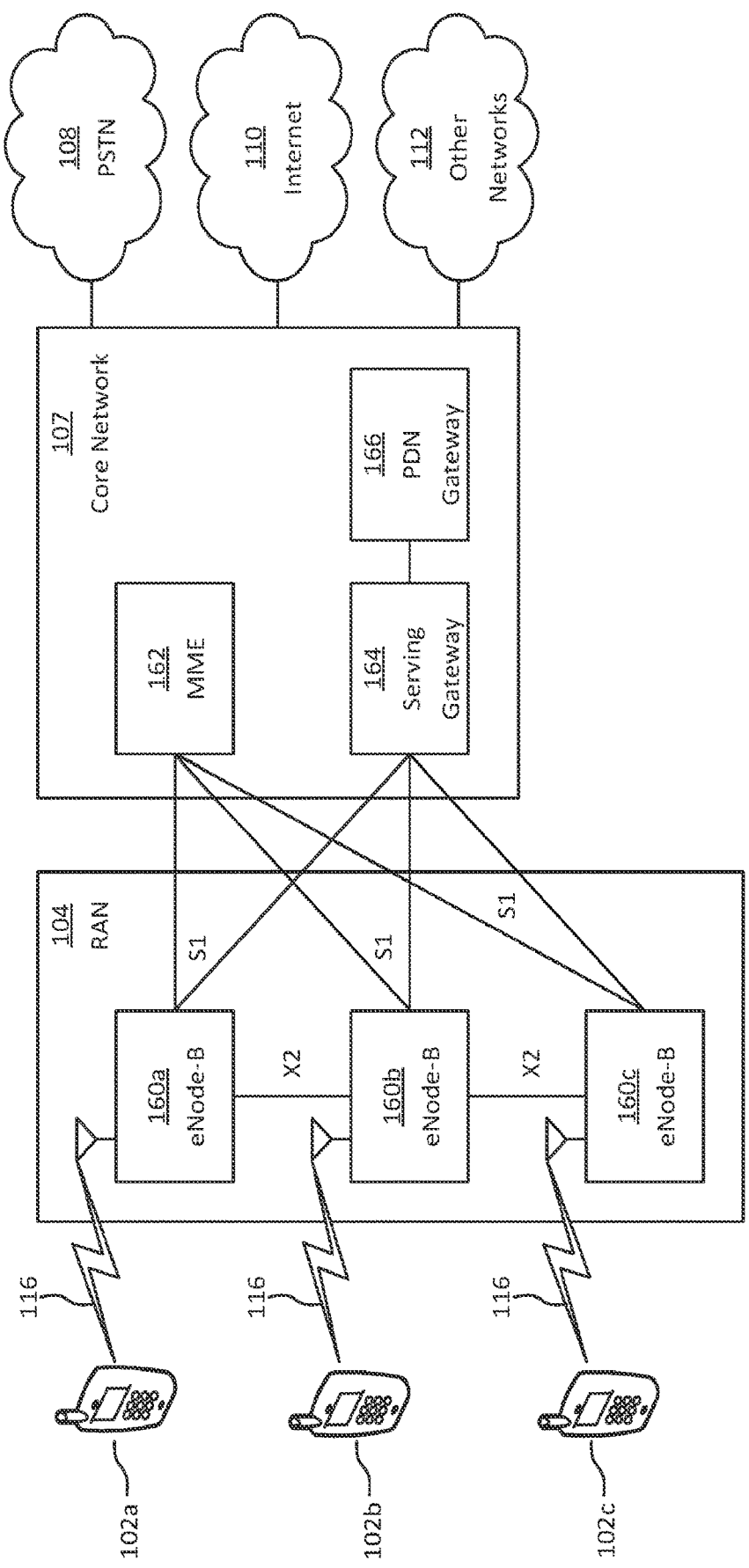
FIG. 6D is a system diagram of a RAN and a core network according to an embodiment.

FIG. 6D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 6D, the eNode-Bs 160a, 160b, 160c may communicate with one another over an X2 interface.

The core network 107 shown in FIG. 6D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 6E:
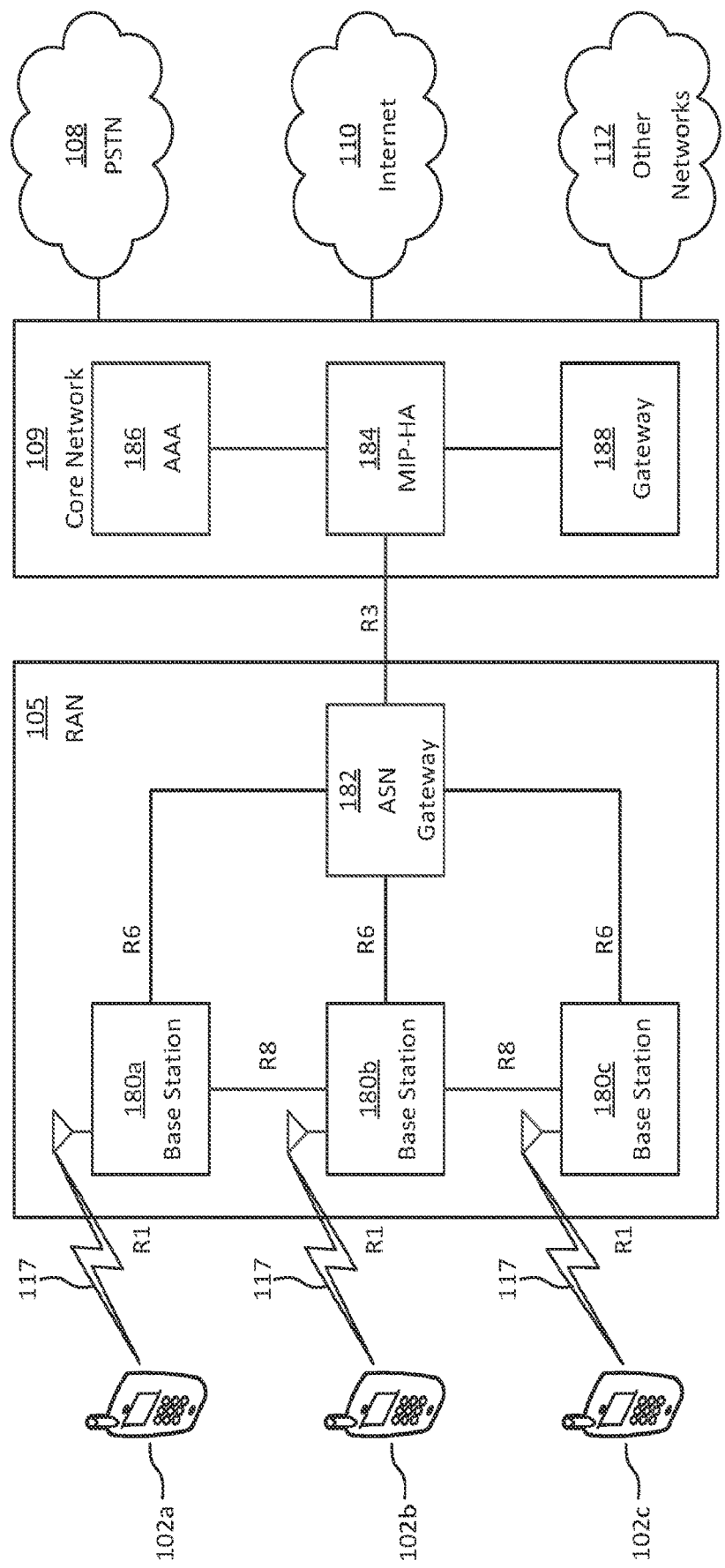
FIG. 6E is a system diagram of a RAN and the core network according to an embodiment.

FIG. 6E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 6E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 6E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 6E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 6A, 6C, 6D, and 6E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 6A, 6B, 6C, 6D, and 6E are provided by way of example only, and it is understood that the subject matter disclosed and claimed herein may be embodied or implemented in any similar communication system, whether presently defined or defined in the future.

Figure 6F:
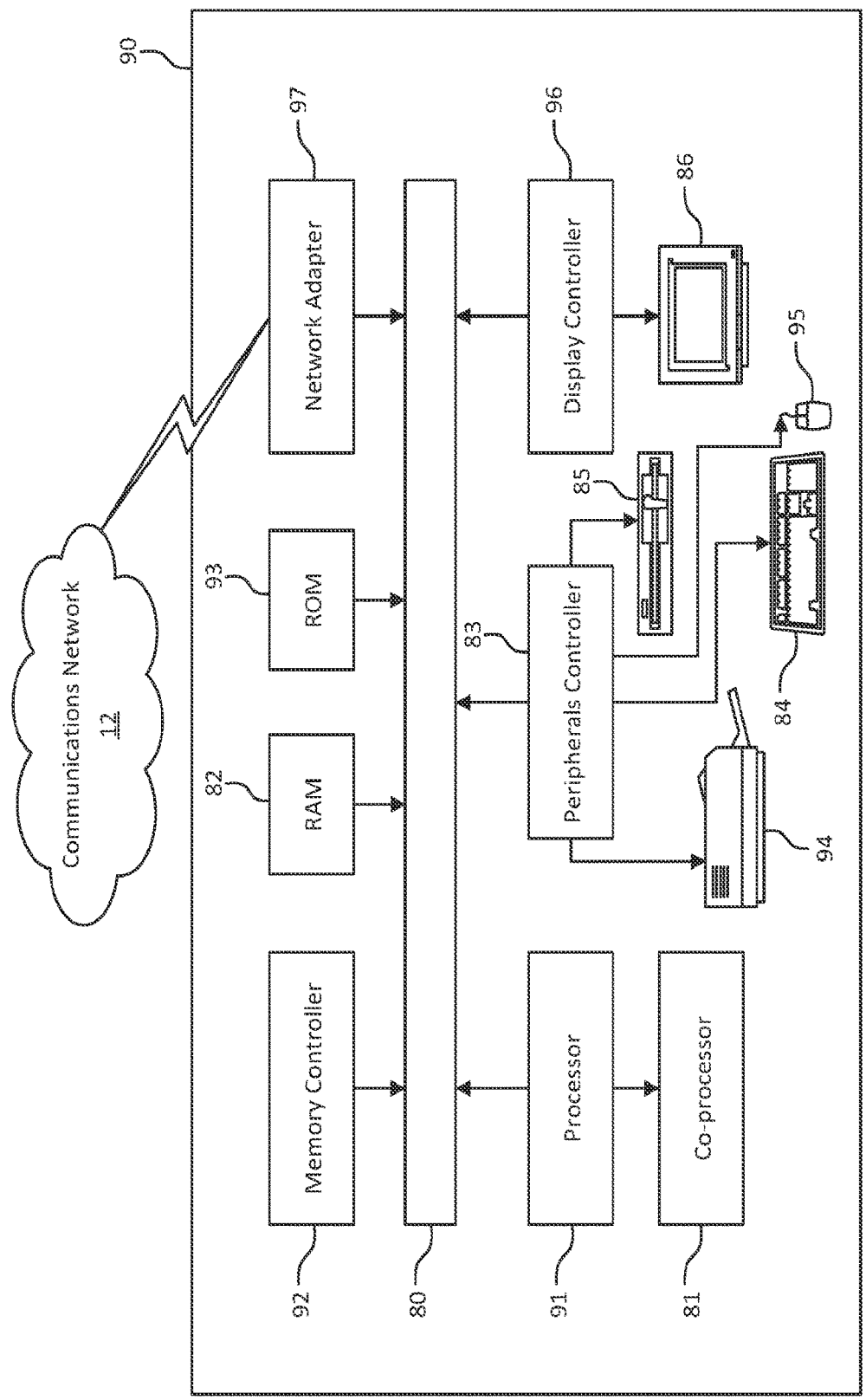
FIG. 6F is a block diagram of an exemplary computing system in which one or more apparatuses of the communications networks illustrated in FIGS. 6A, 6C, 6D and 6E may be embodied.

FIG. 6F is a block diagram of an exemplary computing system 90 in which one or more apparatuses of the communications networks illustrated in FIGS. 6A, 6C, 6D and 6E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 6A, 6B, 6C, 6D, and 6E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 6G:
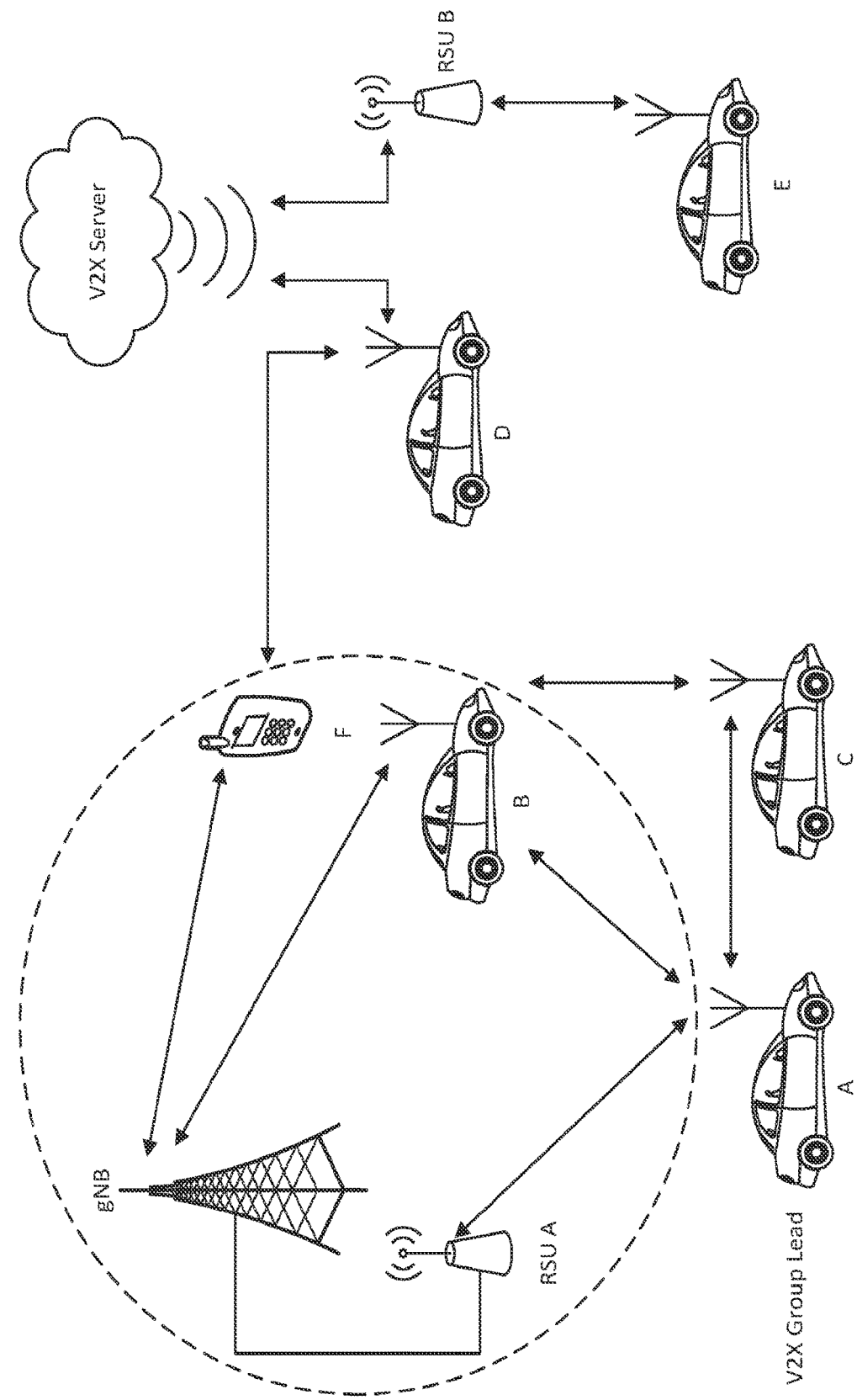
FIG. 6G illustrates one embodiment of an example communications system in which the methods and apparatuses described and claimed herein may be embodied.

FIG. 6G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A wireless transmit/receive unit (WTRU), comprising a transceiver and one or more processors, configured to:
    receive information indicating a Quality of Service (QOS) rule comprising:
        a traffic detection rule indicating a trigger condition for applying the QoS rule to uplink data, wherein the uplink data is associated with a fully qualified domain name (FQDN), a uniform resource locator (URL), an application ID, or a user equipment (UE) route selection policy (URSP) rule, and
        a time gating condition or a volume gating condition for applying the QoS rule;
    detect uplink data satisfying the trigger condition;
    assign, based on satisfaction of the trigger condition, the detected uplink data to a first QOS flow associated with the QoS rule; and
    assign, based on satisfaction of the time gating condition or the volume gating condition, the detected uplink data to a second QoS flow.

2. The WTRU of claim 1, wherein the time gating condition indicates a time to start and end application of the QoS rule.

3. The WTRU of claim 1, wherein the time gating condition comprises timer for starting and ending application of the QoS rule.

4. The WTRU of claim 1, wherein the volume gating condition indicates a maximum number of packets for applying the QoS rule.

5. The WTRU of claim 1, wherein the information indicating the QoS rule is provided by a session management function (SMF).

6. The WTRU of claim 1, wherein the information indicating the QoS rule is received via an Access and Mobility Management Function (AMF).

7. The WTRU of claim 1, wherein the QoS rule is provided to a policy control function (PCF).

8. The WTRU of claim 1, wherein the QoS rule is derived based on input from a third party to one or more network functions (NFs) or one or more application functions (AFs).

9. The WTRU of claim 1, wherein the information indicating the QoS rule is received in a non-access stratum (NAS) message.

10. The WTRU of claim 1, wherein the trigger condition comprises matching the detected uplink data to the FQDN, the URL, the application ID, or the URSP rule.

11. A method for use in a wireless transmit/receive unit (WTRU) comprising a transceiver and one or more processors, the method comprising:
    receiving information indicating a Quality of Service (QoS) rule comprising:
        a traffic detection rule indicating a trigger condition for applying the QoS rule to uplink data, wherein the uplink data is associated with a fully qualified domain name (FQDN), a uniform resource locator (URL), an application ID, or a user equipment (UE) route selection policy (URSP) rule, and
        a time gating condition or a volume gating condition for applying the QoS rule;
    detecting uplink data satisfying the trigger condition;
    assigning, based on satisfaction of the trigger condition, the detected uplink data to a first QoS flow associated with the QoS rule; and
    assigning, based on satisfaction of the time gating condition or the volume gating condition, the detected uplink data to a second QoS flow.

12. The method of claim 11, wherein the time gating condition indicates a time to start and end application of the QoS rule.

13. The method of claim 11, wherein the time gating condition comprises timer for starting and ending application of the QoS rule.

14. The method of claim 11, wherein the volume gating condition indicates a maximum number of packets for applying the QoS rule.

15. The method of claim 11, wherein the information indicating the QoS rule is provided by a session management function (SMF).

16. The method of claim 11, wherein the information indicating the QoS rule is received via an Access and Mobility Management Function (AMF).

17. The method of claim 11, wherein the QoS rule is provided to a policy control function (PCF).

18. The method of claim 11, wherein the QoS rule is derived based on input from a third party to one or more network functions (NFs) or one or more application functions (AFs).

19. The method of claim 11, wherein the information indicating the QoS rule is received in a non-access stratum (NAS) message.

20. The method of claim 11, wherein the trigger condition comprises matching the detected uplink data to the FQDN, the URL, the application ID, or the URSP rule.

* * * * *